(12) United States Patent
Tanaka et al.

(10) Patent No.: US 6,671,083 B2
(45) Date of Patent: Dec. 30, 2003

(54) RAMAN AMPLIFIER AND OPTICAL TRANSMISSION SYSTEM

(75) Inventors: Toshiki Tanaka, Kawasaki (JP); Kenichi Torii, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/101,265

(22) Filed: Mar. 20, 2002

(65) Prior Publication Data
US 2003/0117692 A1 Jun. 26, 2003

(30) Foreign Application Priority Data
Dec. 21, 2001 (JP) ......................... 2001-390366

(51) Int. Cl.[7] ................................. H01S 3/00
(52) U.S. Cl. .................. 359/334; 359/341.3
(58) Field of Search ................ 359/334, 341.3

(56) References Cited

U.S. PATENT DOCUMENTS 6,424,455 B1 * 7/2002 Dmitri .................. 359/334

FOREIGN PATENT DOCUMENTS

| JP | 60-263538 | 12/1985 |
| JP | 02-153327 | 6/1990 |
| JP | 2000-151507 | 5/2000 |
| JP | 2001-185787 | 7/2001 |
| WO | WO 00/49721 | 8/2000 |

OTHER PUBLICATIONS

Yoshihiro Emori et al., 100nm Bandwidth Flat Gain Raman Amplifiers Pumped and Gain–Equalized by 12–Wavelength–Channel WDM High Power Laser Diodes, 1999, pp. PD19–1 through PD19–3.
C.R. Davidson, et al., 1800 Gb/s Transmission of One Hundred and Eighty 10 Gb/s WDM Channels over 7,000 km using the Full EDFA C–Band, 2000, pp. PD25–1 through PD253.
Yutaka Yano et al., Experimental Study on SRS Loss and its Compensation in Three–Band WDM Transmission, Electronic Information Communication Academy, Electronics Society Congress, B–10–167, 2000.

* cited by examiner

*Primary Examiner*—Mark Hellner
(74) *Attorney, Agent, or Firm*—Staas & Halsey LLP

(57) ABSTRACT

The present invention aims at providing a Raman amplifier and an optical transmission system, capable of reducing characteristic deterioration to be caused by excitation lights mixedly existing within a wavelength band of signal lights. To this end, the Raman amplifier of the present invention comprises an excitation light source that generates excitation lights having a wavelength band overlapped with a wavelength band of the signal lights, a multiplexing unit that supplies the excitation lights to an optical transmission path, and an optical filter that suppresses optical components which are included in lights propagated through an optical transmission path and are of the same wavelengths as those of the excitation lights.

22 Claims, 21 Drawing Sheets

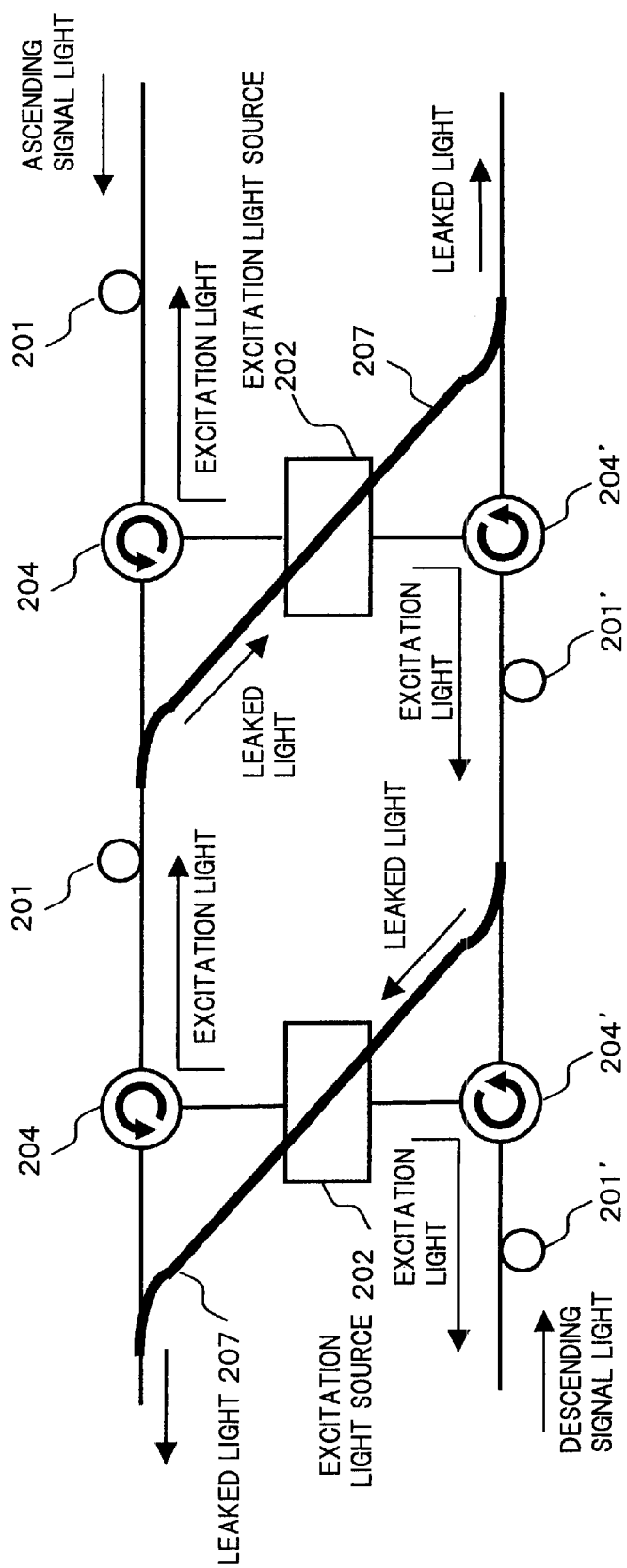

RAMAN AMPLIFIER AND OPTICAL TRANSMISSION SYSTEM

BACKGROUND OF THE INVENTION

(1) Field of the Invention

The present invention relates to a Raman amplifier and an optical transmission system for supplying excitation lights to an amplifying medium on an optical transmission path, and particularly, to a technique for reducing characteristic deterioration caused due to excitation lights mixedly existing within a wavelength band of signal light.

(2) Related Art

In conventional long distance optical transmission systems, there has been adopted an optical regenerating repeater for converting an optical signal into an electrical signal, and for reshaping, retiming and regenerating the electrical signal, to thereby perform an optical transmission. However, with the recent development of the practical use of optical amplifiers, there has been investigated an optical amplifying-and-repeating transmission system for utilizing an optical amplifier as a linear repeater. Namely, by replacing the optical regenerating repeater by an optical amplifying repeater, it is expected that the number of constituent parts within the repeater are drastically decreased, and the cost is drastically reduced while ensuring reliability.

As one of methods for realizing a large capacity of optical transmission system, attention has been directed to a wavelength division multiplexing (WDM) optical transmission system for multiplexing optical signals of two or more different wavelengths to transmit to one transmission path.

In a WDM optical amplifying-and-repeating transmission system combining the aforementioned optical amplifying-and-repeating transmission system with the WDM optical transmission system, it is possible to collectively amplify WDM signal lights by utilizing an optical amplifier, thereby enabling to realize a large capacity and long distance transmission with a simple configuration (economical merit).

FIG. 25 is a view showing an exemplary configuration of a typical WDM optical amplifying-and-repeating transmission system.

The system of FIG. 25 comprises: for example, an optical sender station 101; an optical receiver station 102; an optical transmission path 103 that connects between the optical sender station and the optical receiver station; and a plurality of optical repeaters 104 arranged on the optical transmission path 103 at required intervals. The optical sender station 101 includes: a plurality of optical senders (E/Os) 101A that output a plurality of optical signals of different wavelengths, respectively; a multiplexer 101B that wavelength division multiplexes the plurality of optical signals into a WDM signal light; and a post-amplifier 101C that amplifies the WDM signal light from the multiplexer 101B to a required level, to thereby output the amplified WDM signal light to the optical transmission path 103. The optical receiver station 102 includes: a pre-amplifier 102C that amplifies the WDM signal light of respective wavelength bands, that has been transmitted via the optical transmission path 103, to a required level; a demultiplexer 102B that demultiplexes an output light from the pre-amplifier 102C into a plurality of optical signals corresponding to the wavelengths thereof; and a plurality of optical receivers (O/Es) 102A that receives to process the plurality of optical signals, respectively. The optical transmission path 103 includes a plurality of repeating sections that connect between the optical sender station 101 and the optical receiver station 102. The WDM signal light sent from the optical sender station 101 is propagated through the optical transmission path 103, is optically amplified by each optical repeater 104 arranged in each repeating section, and then, is propagated through the optical transmission path 103, and is transmitted up to the optical receiver station 102, while repeating the above propagation and amplification.

For each of the optical repeaters 104 of the aforementioned WDM optical amplifying-and-repeating transmission system, there is typically adopted an erbium-doped fiber amplifier (EDFA). A gain wavelength band of such an EDFA is a 1.55 $\mu$m band (C-band), while a gain wavelength band of a GS-EDFA (Gain shifted-EDFA) obtained by shifting a gain band of the EDFA to a longer wavelength side, is a 1.58 $\mu$m band (L-band). Each of the EDFA and the GS-EDFA has a gain wavelength bandwidth of 30 nm or above. Thus, by utilizing a multiplexing and demultiplexing device corresponding to both of the C-band and L-band to thereby use together the two signal light wavelength bands, it is possible to realize the amplifying-and-repeating transmission of WDM signal light having a wavelength bandwidth of 60 nm or above.

Recently, it has been also tried to apply Raman amplification to the aforementioned optical transmission system. The Raman amplification has a characteristic with a gain peak at the frequency lower than the frequency of excitation light by 13.2 THz, in a case where a silica ($SiO_2$) based optical fiber doped with germanium (Ge) for example, is adopted as an amplifying medium. Therefore, a Raman gain is caused at a longer wavelength side than a wavelength of excitation light. For example, a peak wavelength of the Raman gain is 1.55 $\mu$m, which is shifted to the longer wavelength side by about 100 nm relative to an excitation light wavelength of 1.45 $\mu$m. Thus, it is possible to freely set a gain wavelength band and a bandwidth of Raman amplification, by selecting a plurality of excitation light wavelengths to adjust an excitation light power. Namely, in the Raman amplification, in order to realize an amplifying function for a required signal light wavelength, it is important to be able to set an excitation light wavelength taking account of the shift frequency in the Raman gain. It is also possible to flatten a gain wavelength characteristic of Raman amplification, by using a plurality of excitation lights having different oscillation center wavelengths.

Specifically, in a Raman amplifier such as shown in Y. Emori, et al., "100 nm bandwidth flat gain Raman amplifiers pumped and gain equalized by 12-wavelength-channel WDM high power laser diodes", OFC'99, PD19, 1999, excitation light powers and oscillation wavelengths thereof are adjusted to ensure about 100 nm as a gain wavelength bandwidth of Raman amplifier. As shown in one example of FIG. 26, typically, such a conventional Raman amplifier is constituted so that excitation lights from an excitation light source 202 are supplied to be propagated through an optical fiber 201 acting as an amplifying medium, in a direction opposite to the propagation direction of signal lights. In this exemplary configuration, for a multiplexer 203 that supplies excitation lights to the optical fiber 201, a wavelength multiplexer (WDM coupler) having ports for transmitting lights of different wavelengths, respectively. In the aforementioned Raman amplifier, as shown in FIG. 27, a plurality of excitation lights $P_1$ to $P_K$ of different wavelengths and a plurality of signal lights $S_1$ to $S_L$ of different wavelengths are arranged corresponding to the shift frequencies of Raman gains, to form such a wavelength arrangement that the wavelength band $\lambda_{P1}$ to $\lambda_{PK}$ of the excitation lights and the wavelength band $\lambda_{S1}$ to $\lambda_{SL}$ of the signal lights are separated into different regions.

Meanwhile, there has been proposed a hybrid amplifier combining a Raman amplifier with an EDFA, such as in "Consideration of SRS loss and compensating method in 3-band WDM transmission" (Society Conference 2000, B-10-167, by Institute of Electronics, Information and Communication Engineer) by Yano et al. This article described a hybrid amplifier having a constitution as shown in FIG. 28, in which an optical circulator 204 is adopted as a multiplexer that supplies excitation lights for Raman amplification to an amplifying medium.

Moreover, it is important to further broaden a wavelength bandwidth of signal lights, in order to realize a large capacity and long distance transmission system. To realize such a broad band of signal lights, for a system adopting Raman amplification, as shown in FIG. 29, the present applicant has proposed that such an arrangement is effective, in which a part of the wavelength band $\lambda_{P1}$ to $\lambda_{PM}$ of excitation lights overlaps with the wavelength band $\lambda_{S1}$ to $\lambda_{SN}$ of signal lights so that excitation lights and signal lights mixedly exist within the same wavelength region (see Japanese Patent Application No. 2001-030053 (unpublished)). In such a case, it is also effective to adopt the aforementioned optical circulator having no limitation on the aforementioned wavelength band, as a multiplexer that supplies excitation lights to the amplifying medium.

However, there may be the following problems accompanying to a broad band of signal lights, in the above conventional optical transmission techniques adopting the Raman amplification. Namely, when the wavelength bandwidth of signal lights is broadened, in accordance with this, the wavelength bandwidth of excitation lights is also broadened, such that the signal lights and excitation lights mixedly exist within the same wavelength region as previously illustrated in FIG. 29. In this case, there is a possibility of occurrence of linear cross-talk and/or non-linear cross-talk due to Rayleigh scattering of excitation lights, in a constitution of backward excitation type using a multiplexer such as the optical circulator 204 shown in FIG. 28.

Specifically, when the backward excitation lights supplied to the amplifying medium via the multiplexer from the excitation light source are propagated through the amplifying medium, Rayleigh scattering lights of the same wavelengths as those of the excitation lights, respectively, are generated and propagated in the same direction as the signal lights. These Rayleigh scattering lights are attenuated by virtue of the transmission loss of the amplifying medium, when the wavelengths of the Rayleigh scattering lights are outside the wavelength band of signal lights. However, when the wavelengths of these Rayleigh scattering lights are within the wavelength band of signal lights, these Rayleigh scattering lights are propagated through the amplifying medium while maintaining the power thereof, since the transmission loss is compensated for by the Raman gain. For example, if a power of excitation lights having wavelengths mixedly existing within the wavelength band of signal lights is 20 dBm (100 mW), there may be caused a power of the lights returning to the multiplexer due to the Rayleigh scattering may be about −10 dBm (0.1 mW). This means that the Rayleigh scattering lights maintaining a power of certain level will pass through the multiplexer together with the signal lights.

Such Rayleigh scattering lights are to be generated in each repeating section, in a case of an optical amplifying-and-repeating transmission system that performs distributed Raman amplification by using, for example, an optical transmission path as an amplifying medium. Thus, as the transmission distance is increased, the Rayleigh scattering lights are accumulated to thereby have a larger power. For example, in the aforementioned case, a power of the Rayleigh scattering lights accumulated after repeated for 100 repeating sections each having a length of 50 km, becomes about 10 dBm (10 mW). As such, an optical S/N ratio of the signal lights of wavelengths adjacent to such Rayleigh scattering lights is regarded to be deteriorated due to the linear cross-talk.

Further, since the Rayleigh scattering lights of the excitation lights mixedly existing within the wavelength band of signal lights are accumulated to thereby increase the power thereof, there is a possibility of occurrence of four-wave mixing between the Rayleigh scattering lights and signal lights, such as shown in FIG. 30. Generally, the signal light power per channel in an output of an optical repeater is on the order of −10 dBm. However, the power of the accumulated Rayleigh scattering lights of the excitation lights may largely exceed the signal light power. Therefore, there may be a possibility of occurrence of the four-wave mixing which is one of non-linear optical effects. Further, in a case where a beat noise between the newly generated four-wave mixing light and the existing signal lights is within a base band of optical receiver, there is caused the deterioration of transmission characteristic considerably greater than the deterioration due to power cross-talk.

Meanwhile, for a technique for suppressing useless light in the Raman amplification, the removal of spontaneous Raman scattering lights to be generated when signal lights are Raman amplified, has been disclosed in Japanese Unexamined Patent Publication Nos. 2-153327 and 2000-151507. However, the wavelengths of spontaneous Raman scattering lights are shifted from those of excitation lights. Therefore, it is impossible to suppress the Rayleigh scattering lights of the excitation lights even if the above technique is applied, so it is hardly to solve the aforementioned problems. Further, there has been proposed a constitution to block the Rayleigh scattering lights of signal lights, in Japanese Unexamined Patent Publication No. 2001-185787. However, it is also difficult to suppress the Rayleigh scattering lights of the excitation lights, since the wavelengths of signal lights are different from those of excitation lights. Moreover, there has been disclosed a constitution in which an outputting unit of a Raman amplifier is provided with a filter that removes excitation lights, in Japanese Unexamined Patent Publication No. 60-263538. However, in this known technique, since the wavelengths of excitation lights are outside the signal light wavelength band, it is impossible to suppress even the Rayleigh scattering lights of the excitation lights mixedly existing within the signal light wavelength band, so it is hard to solve the aforementioned problems.

As another problem to be caused by excitation lights for Raman amplification, for example as shown in FIG. 31, in a case where a part of Raman amplified signal light is demultiplexed by a demultiplexer 205 so as to monitor the demultiplexed light by an output monitoring unit 206, it is considered that the aforementioned Rayleigh scattering lights of the excitation lights are mixed into the signal lights to act as noises, thereby being an error factor in monitoring the signal light output. Particularly, when the wavelengths of excitation lights and the wavelengths of signal lights are mixedly arranged, the Rayleigh scattering lights of the excitation lights are not attenuated but Raman amplified in the above manner, thereby increasing the power of Rayleigh scattering lights to be input to the output monitoring unit

206. The aforementioned problem is also true in a case where the wavelength band of excitation lights is different from the wavelength band of the signal lights. Namely, although the Rayleigh scattering lights of the excitation lights outside the wavelength band of signal lights are attenuated due to the transmission loss of the amplifying medium, such scattering lights may be an error factor when the output monitoring with higher precision needs to be performed.

Moreover, in a case where the excitation lights are modulated so as to transmit a supervisory signal, the output monitoring unit 206 is input with modulated signal lights and the Rayleigh scattering lights of the excitation lights such that the output monitoring unit 206 is forced to demodulate the supervisory signal from two modulated signals, thereby causing a factor of controlling error. Additionally, since the Rayleigh scattering lights are generated at various positions in the longitudinal direction of the optical fiber, it is also regarded that the Rayleigh scattering lights act as intensity modulating components, to thereby increase the controlling error. Specifically, assuming that the optical speed within the optical fiber is $2\times10^8$ m/s and the effective length of the optical fiber for the excitation lights is in a range of 10 km to 20 km, frequency components in a range of 10 kHz to 40 kHz are caused as the aforementioned intensity modulating components, such that these frequency components act as the noises in output monitoring, thereby causing a factor of controlling error.

Furthermore, as another problem to be caused by excitation lights for Raman amplification, for example as in shown in FIG. 32, in a case of a system structure in which the state of optical transmission path is capable to be measured by utilizing an optical time domain reflectometer (OTDR), such an inconvenience is considered that the excitation lights having been propagated through one optical transmission path 201 (or 201') are propagated through the other optical transmission path 201' (or 201) via optical paths 207 for the OTDR. Namely, during in-service, the backward excitation lights having passed through the optical path 207 for the OTDR become forward excitation lights on the opposite side optical transmission path to thereby change the gain wavelength characteristic of Raman amplification. Also, in performing the OTDR measurement, the excitation lights having passed through the optical path 207 become noises in measuring. Note, the aforementioned measurement utilizing the OTDR is a method for measuring a breakpoint of an optical transmission path, by inputting an optical pulse to the optical transmission path to observe a reflected light from the optical transmission path. This method utilizes such a phenomenon that, in case of no breakpoint of the optical transmission path, only Rayleigh scattering lights of the measuring light are reflected to returned, whereas in case of any breakpoint, Fresnel reflection light returns.

The aforementioned problems in the conventional techniques have been reviewed for the case of the backward excitation type Raman amplification. However, even in performing Raman amplification of forward excitation type where the excitation lights are propagated in the same direction as the signal lights, the same problems as those in the backward excitation type can be considered, by assuming a leaked light from forward excitation lights propagated through the amplifying medium, instead of Rayleigh scattering lights of backward excitation lights.

SUMMARY OF THE INVENTION

The present invention has been achieved in view of the aforementioned problems, and it is therefore an object of the present invention to provide a Raman amplifier and an optical transmission system capable of reducing characteristic deterioration to be caused by excitation lights mixedly existing within wavelength band of signal lights.

To achieve the above object, the present invention provides a Raman amplifier for supplying excitation lights to an amplifying medium on an optical transmission path through which signal lights are propagated, to Raman amplify the signal lights being propagated through the amplifying medium, wherein, when a wavelength band of the excitation lights has a region overlapped with a wavelength band of the signal lights, the Raman amplifier comprises an excitation light wavelength suppressing unit capable of suppressing optical components which are included in lights propagated through the amplifying medium and are of the same wavelengths as those of the excitation lights within the region overlapped with the wavelength band of the signal lights.

According to the Raman amplifier having such a constitution, the excitation lights having the wavelength band overlapped with the wavelength band of the signal lights are supplied to the amplifying medium on the optical transmission path, so that the signal lights being propagated through the optical transmission path are Raman amplified to be sent to the excitation light wavelength suppressing unit. This excitation light wavelength suppressing unit suppresses the optical components which are included in the lights propagated through the amplifying medium and are of the same wavelengths as those of the excitation lights, thereby outputting Raman amplified signal lights substantially excluding useless lights caused by the excitation lights mixedly existing within the wavelength band of the signal lights. Thus, since the aforementioned characteristic deterioration of the signal lights can be reduced, it becomes possible to realize a broad band of signal lights.

As one aspect, the Raman amplifier may comprise: an excitation light generating unit that generates excitation lights; and a multiplexing unit that supplies, to the amplifying medium, the excitation lights from the excitation light generating unit as backward excitation lights to be propagated in a direction opposite to a propagation direction of the signal lights, wherein the excitation light wavelength suppressing unit suppresses Rayleigh scattering lights of the backward excitation lights included in the lights propagated through the amplifying medium. Further, as a specific exemplary constitution, preferably, the multiplexing unit includes: a first port connected to a signal light output end of the amplifying medium; a second port connected to an input end of the excitation light wavelength suppressing unit; and a third port connected to an output end of the excitation light generating unit; wherein the multiplexing unit has a directionality capable of transmitting the light directed from the first port toward the second port and the light from the third port toward the first port.

As another aspect, the Raman amplifier may comprise: an excitation light generating unit that generates the excitation lights; and a multiplexing unit that supplies, to the amplifying medium, the excitation lights from the excitation light generating unit as forward excitation lights to be propagated in the same direction as the propagation direction of the signal lights; wherein the excitation light wavelength suppressing unit suppresses leaked light included in the lights propagated through the amplifying medium.

The present invention further provides an optical transmission system for supplying excitation lights from a Raman amplifier to an amplifying medium on an optical transmission path through which signal lights are propagated, to transmit the signal lights while Raman amplifying the signal lights, wherein, when wavelength band of the excitation lights has a region overlapped with a wavelength band of the signal lights, the optical transmission system comprises an excitation light wavelength suppressing unit capable of suppressing optical components which are included in lights propagated through the amplifying medium and are of the same wavelengths as those of the excitation lights within the region overlapped with the wavelength band of the signal lights. The excitation light wavelength suppressing unit may be provided in the Raman amplifier, a gain compensating device, an optical receiving device and an OTDR-aimed optical path.

According to the optical transmission system having such a constitution, since the excitation light wavelength suppressing unit suppresses the optical components which are propagated together with the signal lights Raman amplified by being propagated through the optical transmission path and are of the same wavelengths as those of the excitation lights, it is avoided that useless lights caused by the excitation lights mixedly existing within the wavelength band of the signal lights are accumulated. Thus, it is possible to transmit signal lights of a broad band with excellent characteristics.

Further objects, features and advantages of the present invention will become more apparent from the following description of preferred embodiments when read in conjunction with the accompanying drawings.

BRIEF DESCRIPTION OF THE DRAWINGS

FIG. 32 is a view for explaining problems in a conventional optical transmission system provided with optical paths for OTDR measurement.

DETAILED DESCRIPTION OF THE INVENTION

There will be described hereinafter embodiments according the present invention, with reference to the accompanying drawings.

Figure 1:
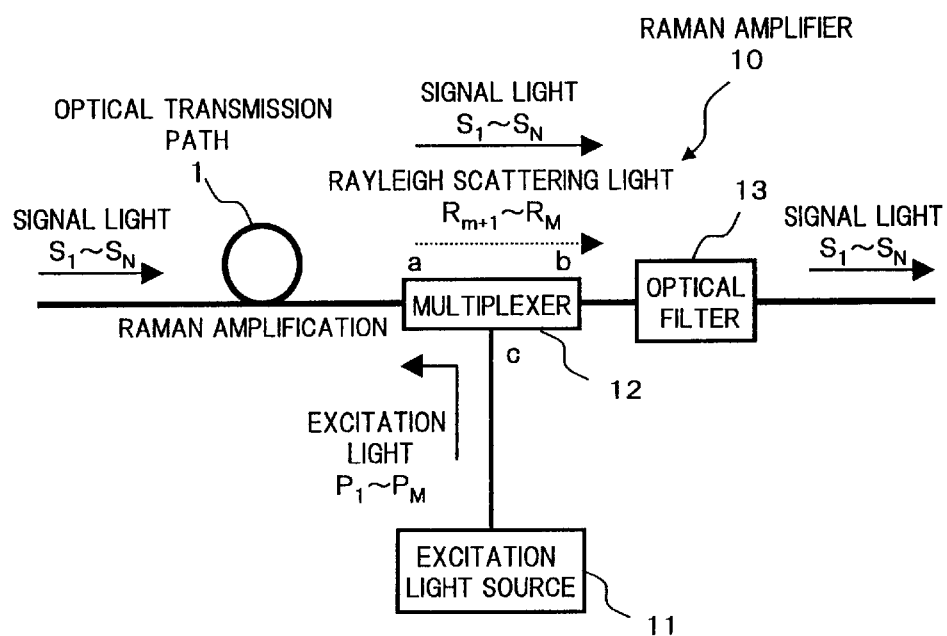
FIG. 1 is a block diagram showing a basic constitution of a Raman amplifier according to the present invention.

FIG. 1 is a block diagram showing a basic constitution of a Raman amplifier according to the present invention.

In FIG. 1, a Raman amplifier 10 comprises, for example, an excitation light source 11 acting as an excitation light generating unit that generates excitation lights corresponding to a WDM signal light being propagated through an optical transmission path 1, a multiplexer 12 acting as a multiplexing unit that supplies the excitation lights output from the excitation light source 11 to the optical transmission path 1, and an optical filter 13 acting as an excitation light wavelength suppressing unit that suppresses optical components which are included in the lights transmitted through the multiplexer 12 and are of the same wavelengths as those of the excitation lights.

Figure 2:
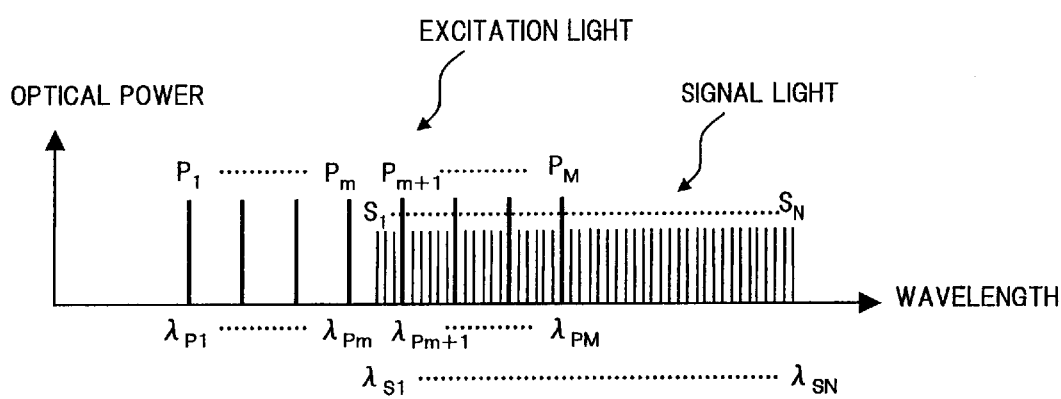
FIG. 2 is a diagram showing an exemplary wavelength arrangement of excitation lights and signal lights in the basic constitution of FIG. 1.

For example, as shown in FIG. 2, the excitation light source 11 generates a plurality of excitation lights $P_1$ to $P_M$ of different wavelengths, and is set so that a partial region on the longer wavelength side of a wavelength band $\lambda_{P1}$ to $\lambda_{PM}$ of the excitation lights overlaps with a wavelength band $\lambda_{S1}$ to $\lambda_{SN}$ of the WDM signal light including a plurality of signal lights $S_1$ to $S_N$ of different wavelengths. Here, the excitation lights outside the wavelength band of the WDM signal light are represented by $P_1$ to $P_m$, while the excitation lights inside the wavelength band of the WDM signal light are represented by $P_{m+1}$ to $P_M$. Note, it is assumed that the wavelengths of the excitation lights $P_{m+1}$ to $P_M$ are set not to overlap with the wavelengths of the signal lights $S_1$ to $S_N$. A gain wavelength band by virtue of the excitation lights $P_1$ to $P_M$ encompasses the whole of the wavelength band of the WDM signal light, so that a substantially flat gain wavelength characteristic is realized by suitably setting the wavelength arrangement and powers of the excitation lights $P_1$ to $P_M$, respectively.

The multiplexer 12 includes, for example, a port "a" connected to a signal light output end of the optical transmission path 1, a port "b" connected to an input end of the optical filter 13 and a port "c" connected to an output end of the excitation light source 11, and transmits the lights directed to directions from the port "a" toward the port "b" and from the port "c" toward the port "a" irrespectively of the wavelength band of such lights, while blocking the lights directed to directions opposite to the above, respectively. It is desirable that the multiplexer 12 has a characteristic that no lights are transmitted in both directions between the port "b" and port "c".

The optical filter 13 is a known device having a filtering characteristic such that the transmissivity for the optical components of the same wavelengths as the respective wavelengths $\lambda_{P1}$ to $\lambda_{PM}$ of the excitation lights $P_1$ to $P_M$ is sufficiently low as compared with the transmissivity for other wavelengths. This optical filter 13 is input with an output light from the port "b" of the multiplexer 12, and a light transmitted therethrough is sent, as an output light from the Raman amplifier 10, to the optical transmission path at the latter stage and the like.

In the Raman amplifier 10 having the aforementioned constitution, the excitation lights $P_1$ to $P_M$ from the excitation light source 11 are supplied via the multiplexer 12 to the optical transmission path 1, so as to be propagated in the direction opposite to the propagation direction of the WDM signal light. Thus, the WDM signal light being propagated through the optical transmission path 1 is subjected to the distributed Raman amplification with the whole of the optical transmission path 1 as the amplifying medium. Further, when the excitation lights $P_1$ to $P_M$ are propagated through the optical transmission path 1, Rayleigh scattering lights $R_1$ to $R_M$ of the same wavelengths $\lambda_{P1}$ to $\lambda_{PM}$ as those of the excitation lights are generated and propagated through the optical transmission path 1 in the same direction as the propagation direction of the WDM signal light. Among the Rayleigh scattering lights $R_1$ to $R_M$, the Rayleigh scattering lights $R_1$ to $R_m$ of the wavelengths outside the wavelength band of signal lights are attenuated by a transmission loss of the optical transmission path 1. However, the Rayleigh scattering lights $R_{m+1}$ to $R_M$ inside the wavelength band of signal lights reach the multiplexer 12 while maintaining a required power, since the transmission loss of the optical transmission path 1 is compensated for by the Raman gain due to the excitation lights $P_1$ to $P_M$. Thus, the port "a" of the multiplexer 12 is mainly input with the Raman amplified signal lights $S_1$ to $S_N$ and the Raman amplified Rayleigh scattering lights $R_{m+1}$ to $R_M$, and these input lights are transmitted to the port "b" and then output to the optical filter 13.

In the optical filter 13, the signal lights $S_1$ to $S_N$ included in the output light from the multiplexer 12 are output to the optical transmission path at the latter stage and the like, at high transmissivity. However, the Rayleigh scattering lights $R_{m+1}$ to $R_M$ are reflected or attenuated, to be suppressed. Further, since the transmissivity of the optical filter 13 is set here to be low for the same wavelengths as those of the excitation lights $P_1$ to $P_m$ outside the wavelength band of signal lights, even if the output light from the multiplexer 12 includes the Rayleigh scattering lights $R_1$ to $R_m$ of a little power outside the wavelength band of signal lights, such Rayleigh scattering lights $R_1$ to $R_m$ are also suppressed by the optical filter 13. Note, if there is substantially no influence of the Rayleigh scattering lights $R_1$ to $R_m$ outside the wavelength band of signal lights, it may be adopted such a setting that the transmissivity of the optical filter 13 is lowered only for the same wavelengths as those of the excitation lights $P_{m+1}$ to $P_M$ inside the wavelength band of signal lights.

In this way, according to the Raman amplifier 10, by providing, at the latter stage of the multiplexer 12, the optical filter 13 that suppresses the optical components of the same wavelengths as those of the excitation lights $P_1$ to $P_M$, even in the case of adopting such a wavelength arrangement that the wavelength band of excitation lights is partly overlapped with the wavelength band of signal lights so that the excitation lights and signal lights mixedly exist in the same wavelength region, it becomes possible to output a Raman amplified WDM signal light which includes substantially no Rayleigh scattering lights $R_1$ to $R_M$ of the excitation lights. Thus, it is possible to reduce characteristic deterioration such as due to linear cross-talk and/or non-linear cross-talk caused by the Rayleigh scattering lights of the excitation lights, thereby enabling to construct an optical transmission system of a large capacity that has realized a broad band of WDM signal light.

Next, there will be explained a specific embodiment of a Raman amplifier adopting the aforementioned basic constitution.

Figure 3:
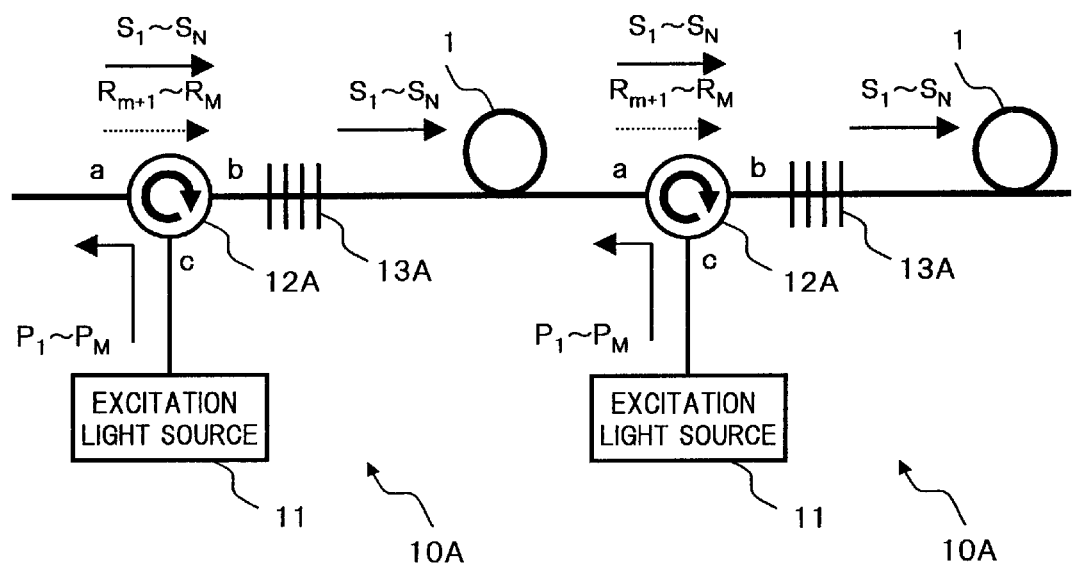
FIG. 3 is a block diagram showing a constitution of a first embodiment of a Raman amplifier according to the present invention.

FIG. 3 is a block diagram showing a constitution of a Raman amplifier of a first embodiment. Same components as those in the basic constitution of FIG. 1 are denoted by same reference numerals, and the same rule applies to other embodiments thereafter.

A Raman amplifier 10A of FIG. 3 is constituted such that, for the basic constitution of FIG. 1, an optical circulator 12A is used as a specific example of the multiplexer 12, and a fiber Bragg grating 13A is used as a specific example of the optical filter 13. Note, in the exemplary constitution of FIG. 3, there is shown a state where two Raman amplifiers 10A, 10A are cascade connected via the optical transmission path 1 acting as the amplifying medium.

The optical circulator 12A includes, for example, three ports "a" connected to the optical transmission path 1, "b" connected to the fiber Bragg grating 13A, and "c" connected to the output end of the excitation light source 11, and transmits the lights directed to directions from the port "a" toward the port "b" and from the port "c" toward the port "a", respectively, while blocking the transmission of lights to other directions.

Figure 4:
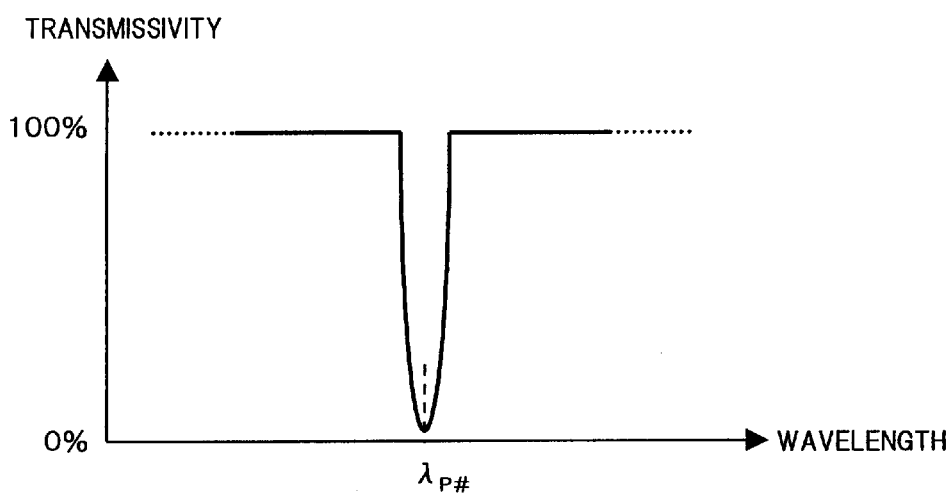
FIG. 4 is a diagram for explaining a filtering characteristic of a fiber Bragg grating in the Raman amplifier of the first embodiment.

The fiber Bragg grating 13A is provided by forming a grating designed to reflect the optical components of the same wavelengths as those of the excitation lights $P_1$ to $P_M$, on the optical transmission path 1 in the vicinity of the port "b" of the optical circulator 12A. If an attention is paid to a certain excitation light $P_\#$, for example, as shown in FIG. 4, the fiber Bragg grating 13A includes a reflecting band in which the transmissivity is steeply changed with the same wavelength as the wavelength $\lambda_{P\#}$ of the excitation light $P_\#$ as a center, and has a filtering characteristic in which such a reflecting band exists corresponding to each of the wavelengths $\lambda_{P1}$ to $\lambda_{PM}$ of the excitation lights, although not shown in the figure.

In the Raman amplifier 10A having the above constitution, the backward excitation lights $P_1$ to $P_M$ are supplied to the optical transmission path 1 via the optical circulator 12A. Further, the WDM signal light that has been propagated through the optical transmission path 1 to thereby be Raman amplified and the Rayleigh scattering lights $R_{m+1}$ to $R_M$ (including feeble Rayleigh scattering lights $R_1$ to $R_m$) of the excitation lights, pass through the optical circulator 12A to enter the fiber Bragg grating 13A. In the fiber Bragg grating 13A, the WDM signal light is transmitted therethrough as it is, while the Rayleigh scattering lights are reflected. These reflected Rayleigh scattering lights are returned to the port "b" of the optical circulator 12A. However, these reflected Rayleigh scattering lights are not transmitted from the port "b" to the port "c", therefore never affecting the operation of the excitation light source 11. Further, in the fiber Bragg grating 13A, leaked lights from backward excitation lights being propagated through the optical transmission path 1 at the latter stage are also reflected, so that the reflected leaked lights are reutilized as forward excitation lights.

In this way, according to the Raman amplifier 10A of the first embodiment, with the specific constitution utilizing the optical circulator 12A and fiber Bragg grating 13A, the Rayleigh scattering lights of the excitation lights can suppressed to thereby reduce the characteristic deterioration due to cross-talk and the like. Also, since the excitation lights are used in a so-called double-pass manner, it becomes possible to obtain a desired gain by a small excitation light power, thereby reducing the electric power consumption.

Figure 5:
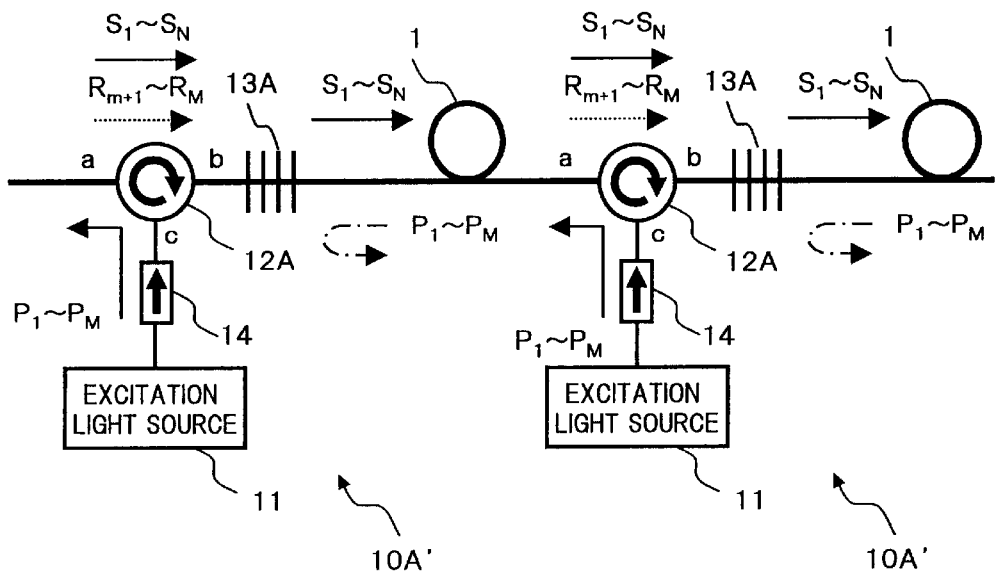
FIG. 5 is a block diagram showing another exemplary constitution related to the Raman amplifier of the first embodiment.

In the above Raman amplifier 10A, the optical circulator 12A has been constituted to have a characteristic in which light is not transmitted in the direction of from the port "b" to the port "c". However, it is also possible to use such an optical circulator that transmits light also in this direction. In this case, for example, as shown in FIG. 5, it is preferable to insert an optical isolator 14 between the output end of the excitation light source 11 and the port "c" of the optical circulator 12A, to prevent the Rayleigh scattering lights reflected by the fiber Bragg grating 13A from entering the excitation light source 11.

Next, there will be explained a Raman amplifier of a second embodiment according to the present invention.

Figure 6:
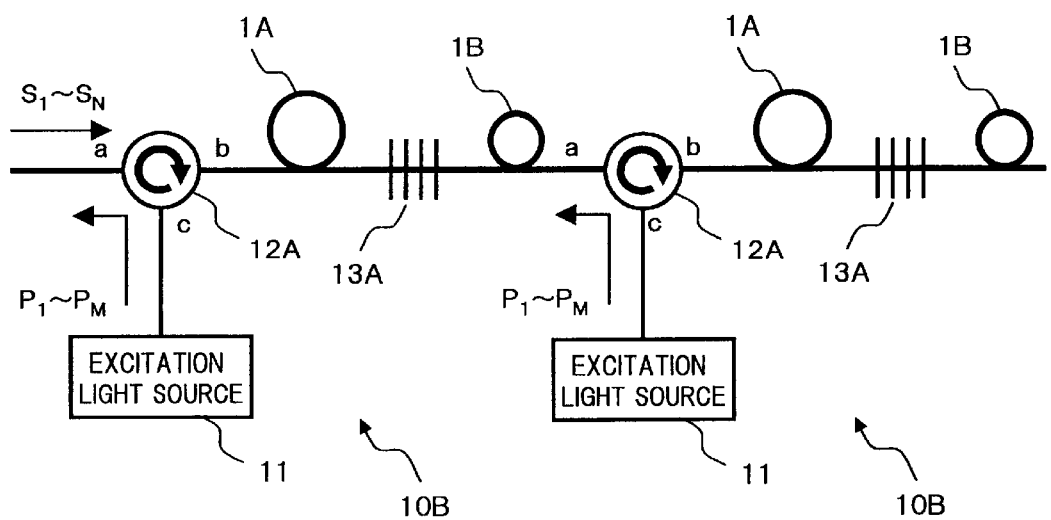
FIG. 6 is a block diagram showing a constitution of a second embodiment of a Raman amplifier according to the present invention.

FIG. 6 is a block diagram showing a constitution of the Raman amplifier of the second embodiment.

FIG. 6 shows a Raman amplifier 10B is constituted such that, as the optical transmission path 1, a hybrid transmission path formed by connecting a positive dispersion fiber 1A and a negative dispersion fiber 1B sequentially is used. The positive dispersion fiber 1A arranged on the former half of the optical transmission path 1 is an optical fiber having a positive wavelength dispersion and a positive dispersion slope relative to a signal light, and specifically, may be a 1.3 μm zero dispersion single mode fiber (SMF), a dispersion-shifted fiber (DSF) or the like. Contrary, the negative dispersion fiber 1B arranged on the latter half of the optical transmission path 1 is an optical fiber that has a negative wavelength dispersion and a negative dispersion slope and is designed to be capable of compensating for the wavelength dispersion and dispersion slope of the positive dispersion fiber 1A. This negative dispersion fiber 1B acts as an amplifying medium that has a smaller non-linear effective cross section as compared with the positive dispersion fiber 1A, to thereby easily obtain a Raman gain. Thus, most of the Raman gain by virtue of the backward excitation lights to be supplied via the optical circulator 12A is given in the negative dispersion fiber 1B on the latter half.

If the aforementioned hybrid transmission path is used, the fiber Bragg grating 13A can be arranged on the former half positive dispersion fiber 1A, and herein, is provided for example, near a connecting point with the negative dispersion fiber 1B.

In the Raman amplifier 10B having the above constitution, in the same manner as in the first embodiment, the WDM signal light that has been sequentially propagated through the positive dispersion fiber 1A and negative dispersion fiber 1B to thereby be Raman amplified and the Rayleigh scattering lights of the excitation lights, are transmitted through the optical circulator 12A and pass through the next positive dispersion fiber 1A to enter the fiber Bragg grating 13A, so that only the Rayleigh scattering lights of the excitation lights are reflected to be suppressed by the fiber Bragg grating 13A. Further, in the fiber Bragg grating 13A, the leaked lights from backward excitation lights which have been supplied from the latter stage Raman amplifier 10B and propagated through the negative dispersion fiber 1B, are also reflected, so that the excitation lights can be utilized in a double-pass manner.

Note, the leaked lights from the excitation lights, which have been reflected by the fiber Bragg grating 13A and again propagated through the negative dispersion fiber 1B, pass through the optical circulator 12A to enter the next positive dispersion fiber 1A. However, an influence of such reflected leaked lights is not so problematic, because the power of the leaked lights at this stage is sufficiently lowered and the non-linear effective cross section of the positive dispersion fiber 1A itself is so large that a Raman gain is hardly obtained.

Thus, according to the Raman amplifier 10B of the second embodiment, there can be obtained the same effect as in the first embodiment, even in the constitution coping with the hybrid transmission path comprising the positive dispersion fiber 1A and negative dispersion fiber 1B.

Figure 7:
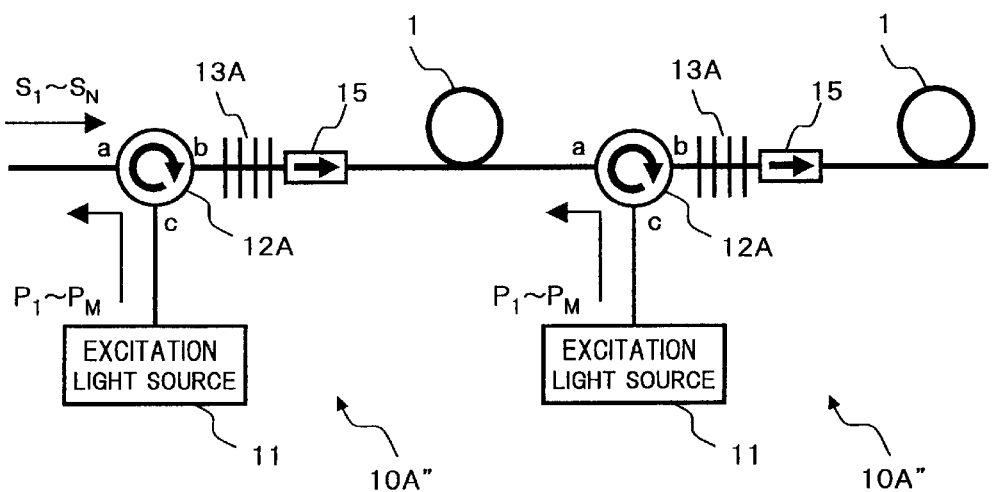
FIG. 7 is a block diagram showing another exemplary constitution related to the Raman amplifier of the second embodiment.

In the Raman amplifiers 10A, 10B of the first and second embodiments, the case has been shown where the excitation lights are utilized in a double-pass manner. However, in a case where there is a possibility of an affection due to such as an interaction between the leaked lights from the backward excitation lights reflected by the fiber Bragg grating 13A and the backward excitation lights before reflection, for example as shown by a Raman amplifier 10A" in FIG. 7, an optical isolator 15 may be inserted to a position just after the fiber Bragg grating 13A (near a signal light output end thereof) to thereby utilize the excitation lights in a single-pass manner.

There will be explained hereinafter a third embodiment of a Raman amplifier according to the present invention.

Figure 8:
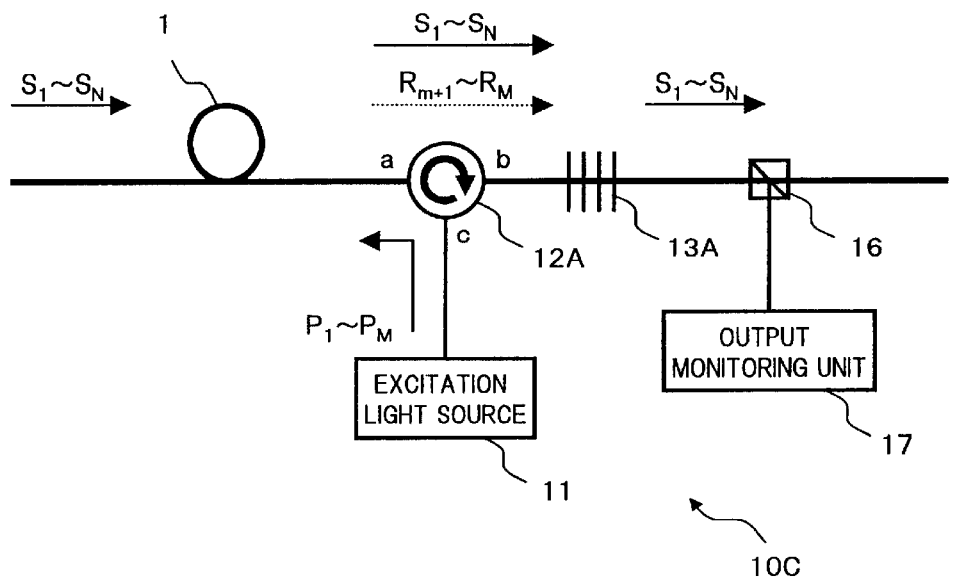
FIG. 8 is a block diagram showing a constitution of a third embodiment of a Raman amplifier according to the present invention.

FIG. 8 is a block diagram showing a constitution of the Raman amplifier of the third embodiment.

A Raman amplifier 10C in FIG. 8 is an example where the present invention is applied to a constitution provided with a function for monitoring a state of Raman amplified WDM signal light. Specifically, in a constitution where a part of the light output from the port "b" of the optical circulator 12A that supplies the excitation lights $P_1$ to $P_M$ to the optical transmission path 1 is demultiplexed by a demultiplexer 16, as a monitor light, and the monitor light is sent to an output monitoring unit 17 to monitor the output state of the Raman amplified WDM signal light, the fiber Bragg grating 13A that suppresses the optical components of the same wavelengths as those of the excitation lights $P_1$ to $P_M$ is provided between the port "b" of the optical circulator 12A and the demultiplexer 16.

The output monitoring unit 17 receives, for example, the monitor light demultiplexed by the demultiplexer 16 to detect a power of the monitor light, so as to monitor the total power of the Raman amplified WDM signal light. Further, in a case where the transmission of a supervisory signal is performed by modulating the excitation lights to thereby intensity modulate the WDM signal light, a demodulation processing of the supervisory signal may be performed by extracting the modulation component from the monitor light. Although the monitoring result in the output monitoring unit 17 is not particularly shown here, such a monitoring result can be utilized for controlling the driving state of the excitation light source 11, for example.

In the Raman amplifier 10C having the above constitution, the Rayleigh scattering lights of the excitation lights, which are included in the light output from the port "b" of the optical circulator 12A, are reflected by the fiber Bragg grating 13A, while the Raman amplified WDM signal light reaches the demultiplexer 16. Thus, the monitor light that does not substantially include noises due to the Rayleigh scattering lights of the excitation lights, is sent to the output monitoring unit 17, thereby enabling to monitor the state of the Raman amplified WDM signal light with high accuracy.

Figure 9:
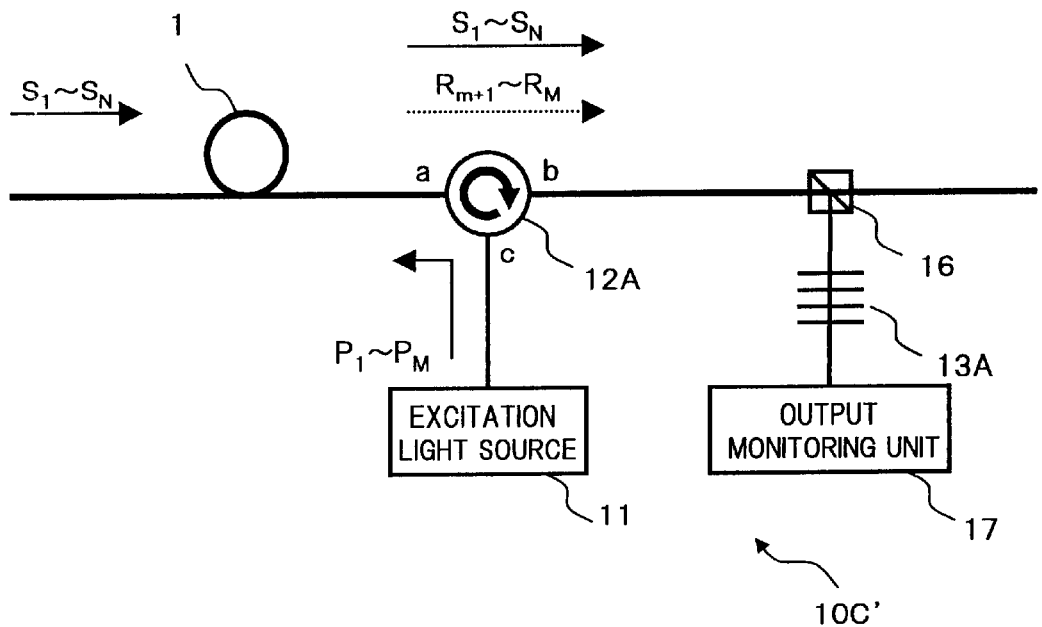
FIG. 9 is a block diagram showing another exemplary constitution related to the Raman amplifier of the third embodiment.
Figure 10:
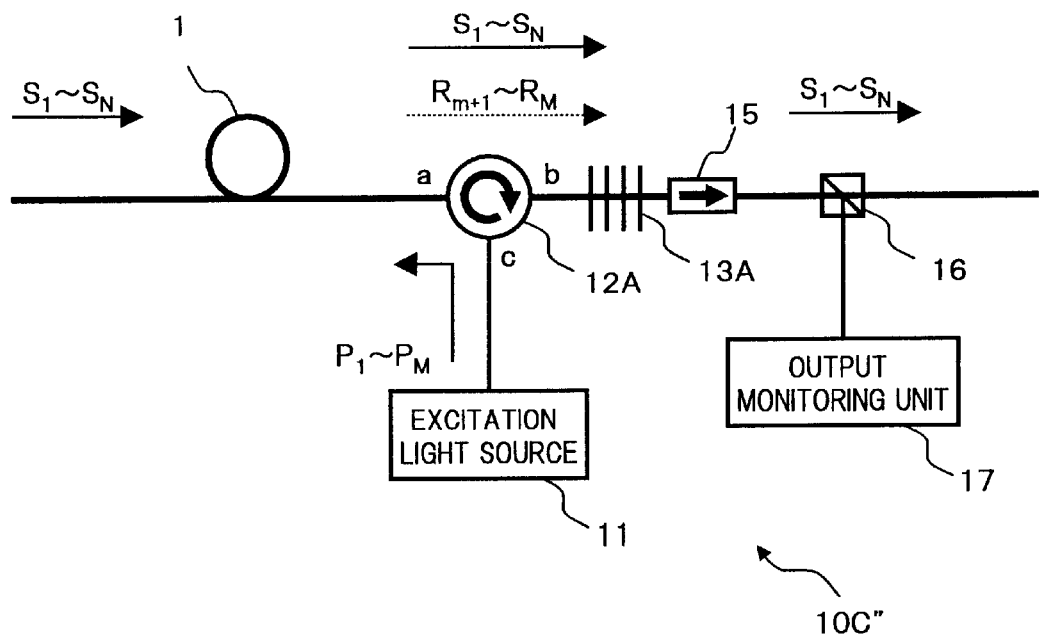
FIG. 10 is a block diagram showing yet another exemplary constitution related to the Raman amplifier of the third embodiment.

In the third embodiment, the case has been described where the fiber Bragg grating 13A is arranged between the optical circulator 12A and the demultiplexer 16. However, only in view of a standpoint that the improvement of the output monitoring accuracy is to be achieved by reducing noises due to the Rayleigh scattering lights of the excitation lights, it is also possible to arrange the fiber Bragg grating 13A between the demultiplexer 16 and the output monitoring unit 17, for example as shown by a Raman amplifier 10C' of FIG. 9. Moreover, similarly to the case shown in FIG. 7, in a case where there is a possibility of an affection due to such as an interaction by the excitation lights, for example as shown by a Raman amplifier 10C" in FIG. 10, the optical isolator 15 may be inserted to a position just after the fiber Bragg grating 13A to thereby utilize the excitation lights in a single-pass manner.

Figure 11:
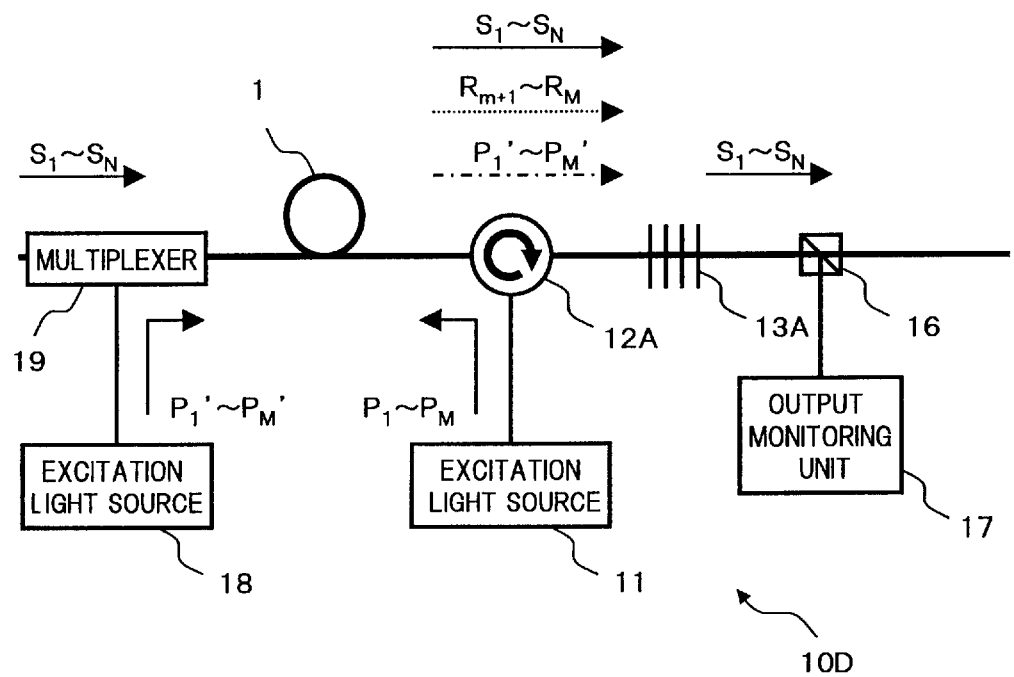
FIG. 11 is a block diagram showing an example related to the Raman amplifier of the third embodiment in a case of corresponding to a bi-directional excitation type constitution.
Figure 12:
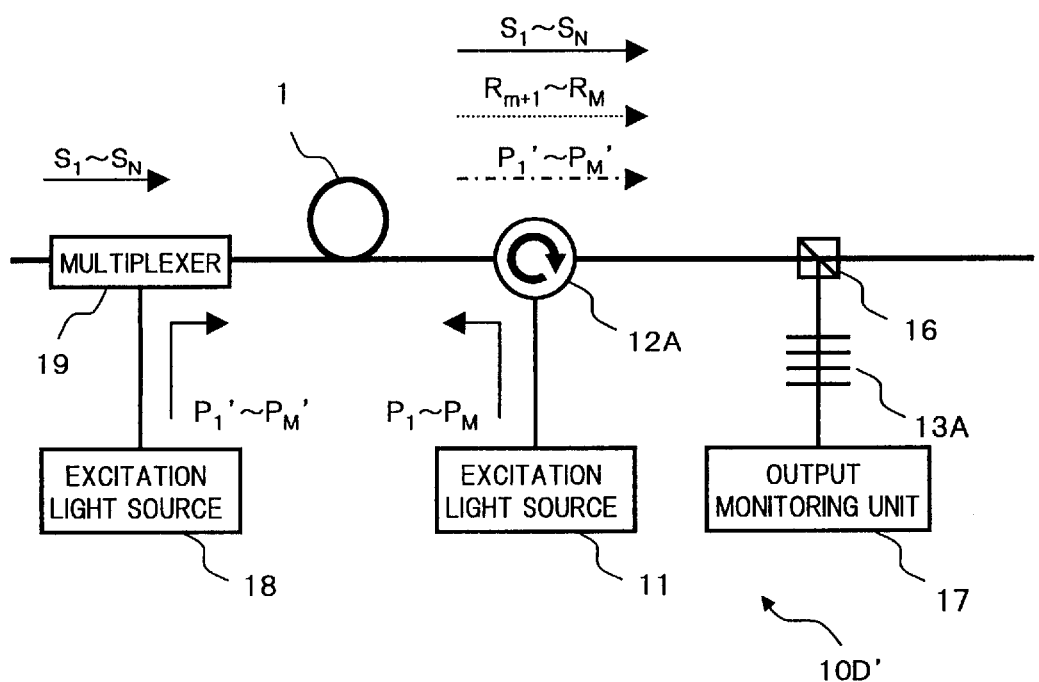
FIG. 12 is a block diagram showing a modified example related to the constitution of FIG. 11.
Figure 13:
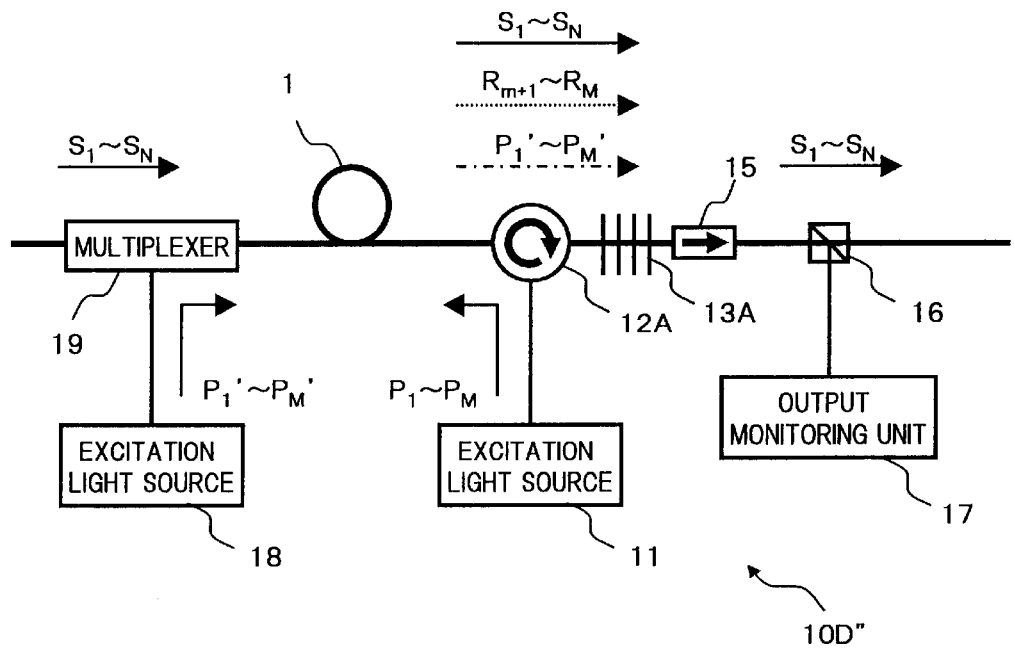
FIG. 13 is a block diagram showing another modified example related to the constitution of FIG. 11.

Furthermore, although there has been described the constitution of the backward excitation type, it is also possible to provide the fiber Bragg grating 13A between the optical circulator 12A and the demultiplexer 16, in a constitution of a bi-directional excitation type, for example as shown by a Raman amplifier 10D shown in FIG. 11, in which an excitation light source 18 and a multiplexer (WDM coupler) 19 are disposed, to supply forward excitation lights $P_1'$ to $P_M'$ to the optical transmission path 1 in addition to the backward excitation lights $P_1$ to $P_M$. In such a constitution, the fiber Bragg grating 13A suppresses not only the Rayleigh scattering lights of the backward excitation lights but also the leaked lights from the forward excitation lights, thereby enabling to precisely monitor the Raman amplified WDM signal light. Moreover, for the bi-directional excitation type constitution, it is also possible to adopt the same constitution as those shown in FIG. 9 and FIG. 10. Such exemplary constitutions shall be shown by a Raman amplifier 10D' in FIG. 12 and a Raman amplifier 10D" in FIG. 13. Although not shown herein, the present invention is of course effective in suppressing leaked lights from forward excitation lights for a constitution of forward excitation type.

Figure 14:
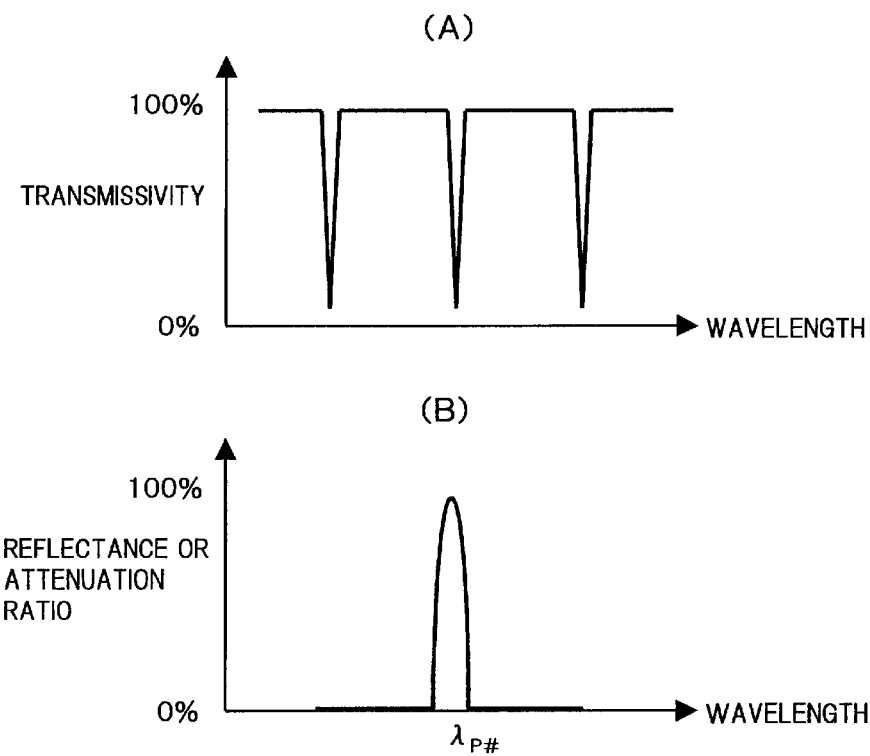
FIG. 14 is a diagram showing an exemplary characteristic of an optical filter to be used in the Raman amplifier of the present invention.

In the aforementioned Raman amplifier of first through third embodiments, the case have been described where the fiber Bragg grating 13A is used as an example of the optical filter 13 that suppresses the optical components of the same wavelengths as those of the excitation lights. However, the present invention is not limited thereto, and it is possible to use a known optical filter having a filtering characteristic corresponding to the respective wavelengths of excitation lights, such as, a notch filter, etalon filter, Mach-Zehnder type filter, and chirped fiber grating. Specifically, in a case where excitation lights of wavelengths at constant intervals, as shown in (A) of FIG. 14, it is effective to use an optical filter having the transmissivity which is periodically changed corresponding to the wavelength intervals of the excitation lights. In this case, it is desirable to use an optical filter of which transmissivity is changed as flatly as possible in the transmission band, so as to prevent attenuation of signal light and also to avoid band limitation by the optical filter. Contrary, when the wavelength intervals of the excitation lights are not constant, as shown in (B) of FIG. 14, it is possible to combine uni-modal optical filters each having reflectance or attenuation ratio to be steeply changed at a required wavelength.

Next, there will be described embodiments of optical transmission system according to the present invention.

Figure 15:
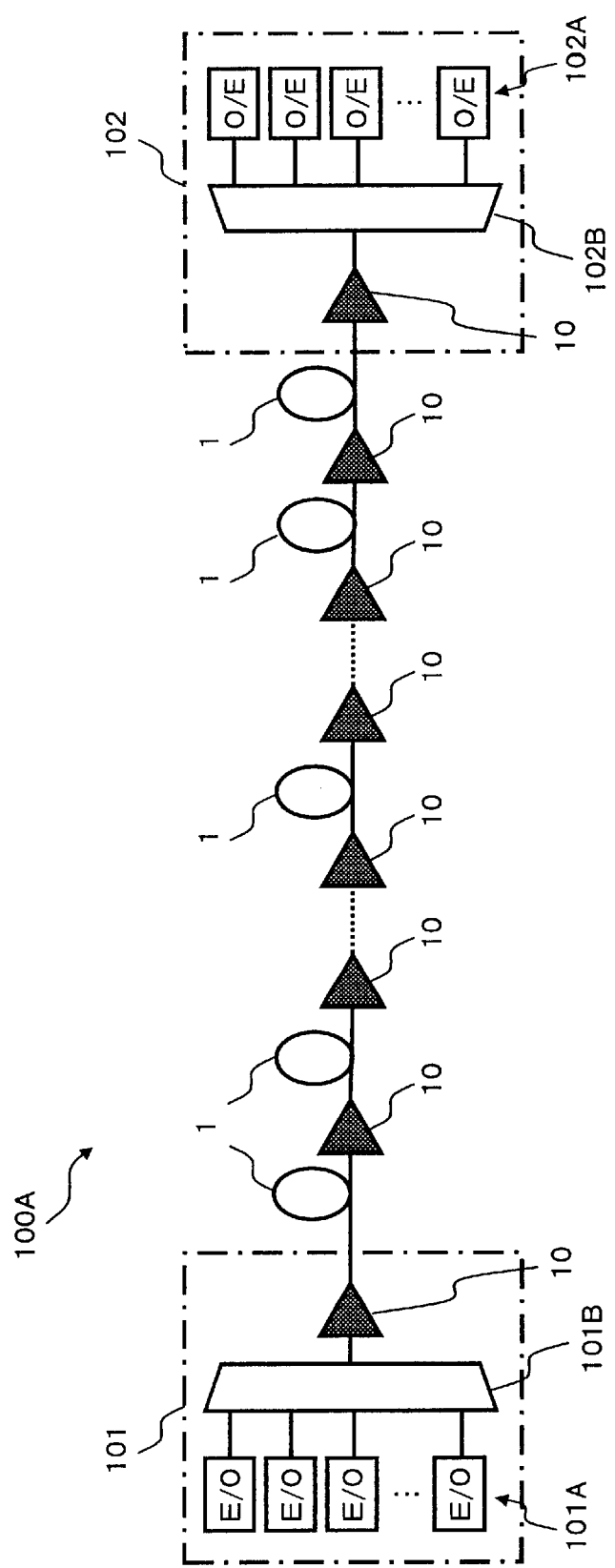
FIG. 15 is a view showing a constitution of a first embodiment of an optical transmission system according to the present invention.

FIG. 15 is a block diagram showing a constitution of a first embodiment of optical transmission system according to the present invention.

Figure 25:
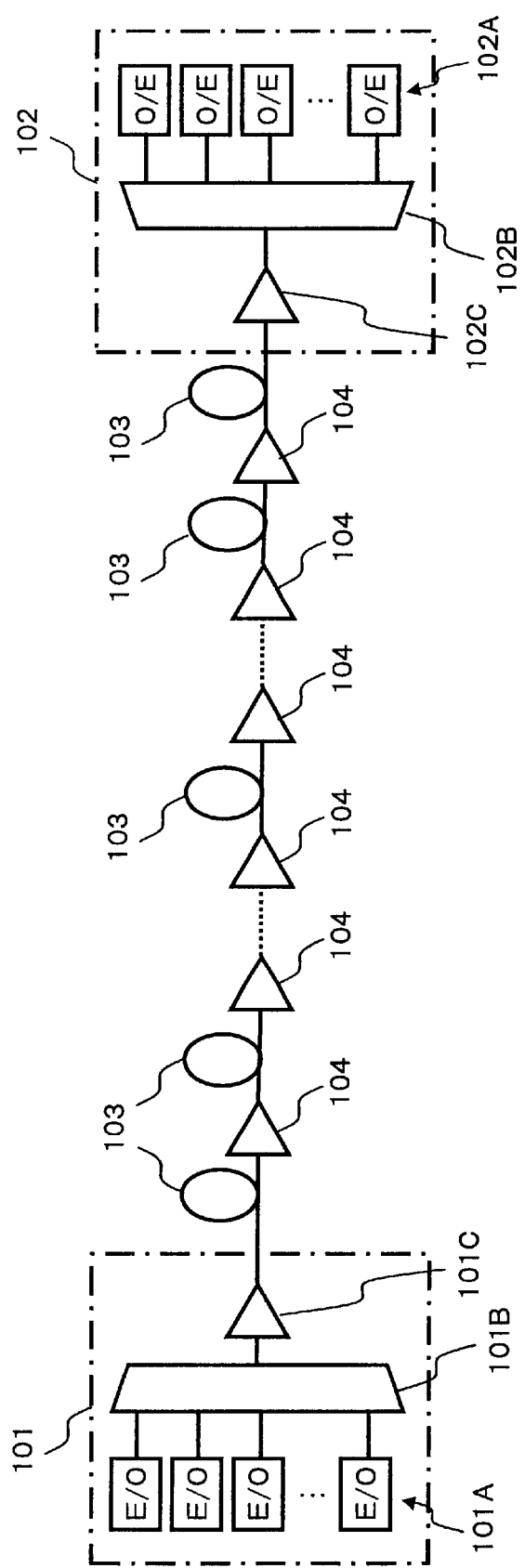
FIG. 25 is a view showing an exemplary constitution of a typical WDM optical amplifying-and-repeating transmission system.
Figure 26:
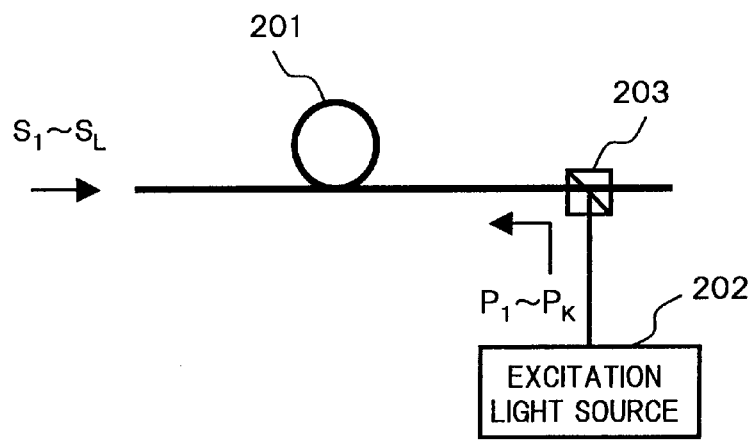
FIG. 26 is a view showing an exemplary constitution of a conventional Raman amplifier.
Figure 27:
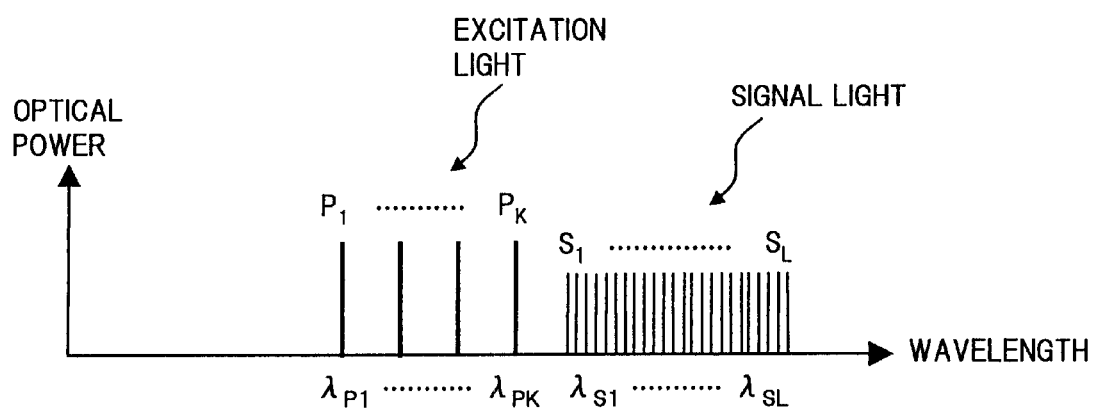
FIG. 27 is a diagram showing an exemplary wavelength arrangement of excitation lights and signal lights in the conventional Raman amplifier.
Figure 28:
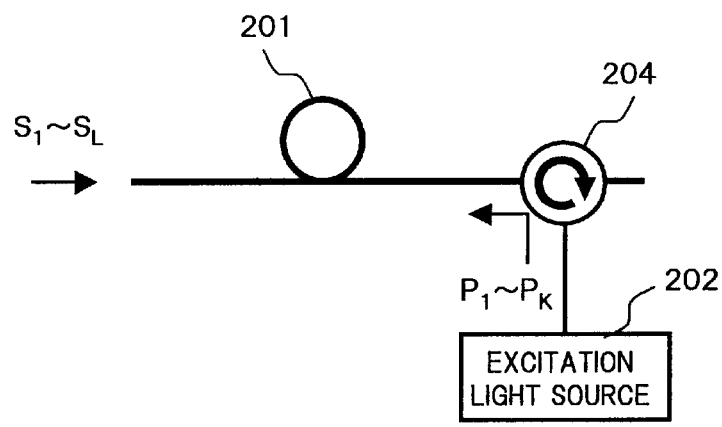
FIG. 28 is a view showing an example using an optical circulator as a multiplexer in the conventional Raman amplifier.
Figure 29:
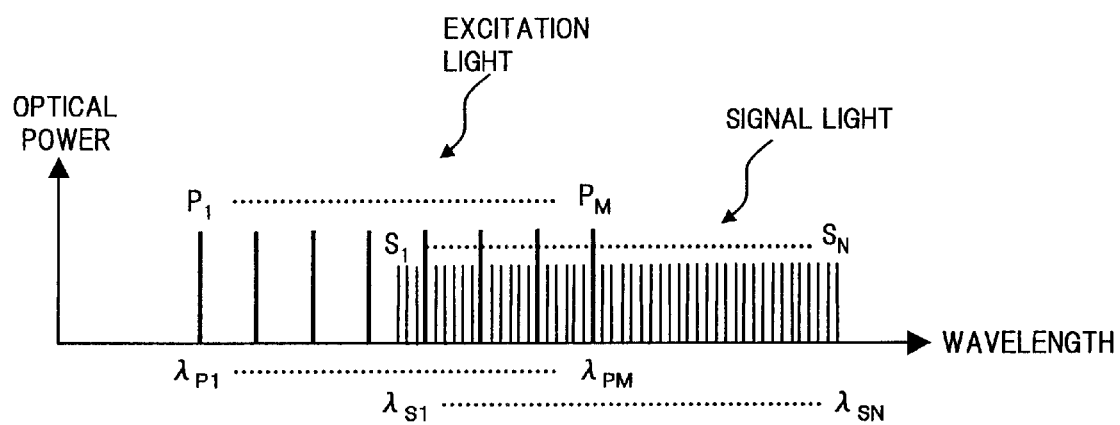
FIG. 29 is a diagram showing an exemplary wavelength arrangement of excitation lights for attempting to broaden a band of signal lights in the conventional Raman amplifier.
Figure 30:
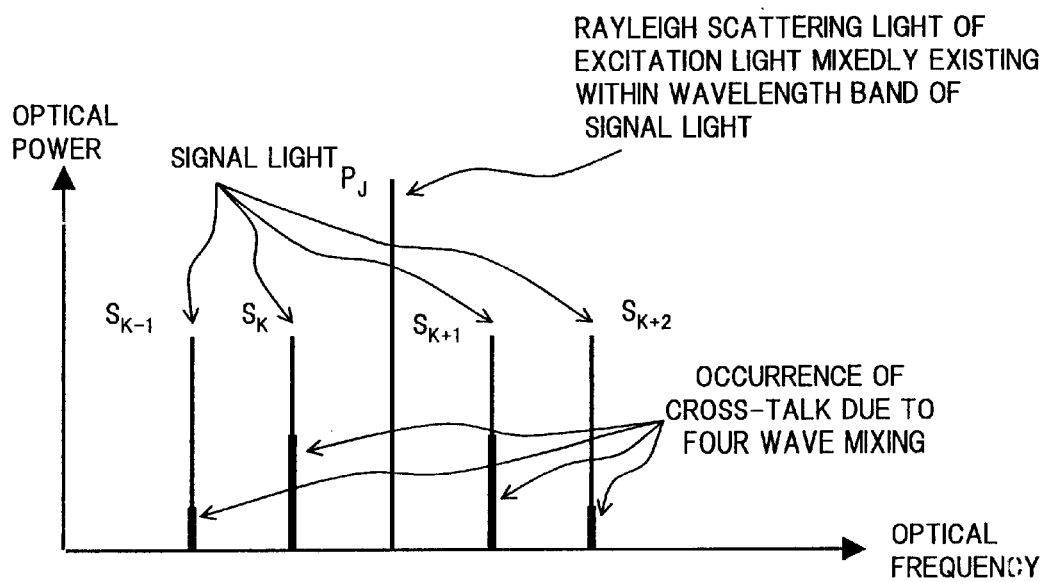
FIG. 30 is a diagram for explaining problems of four-wave mixing in the conventional Raman amplifier.
Figure 31:
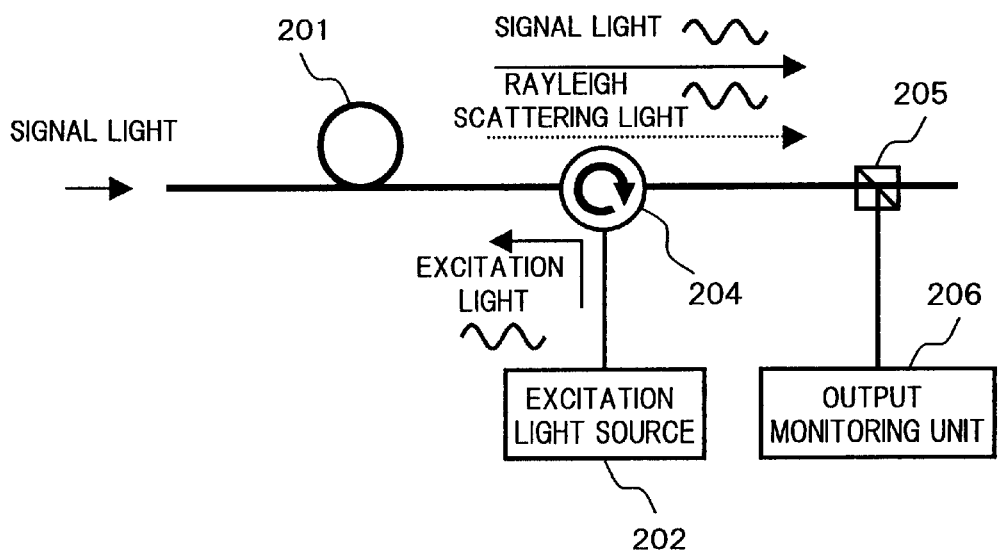
FIG. 31 is a view for explaining problems in another conventional Raman amplifier provided with an output monitoring unit.

An optical transmission system 100A in FIG. 15 is constituted such that the Raman amplifier 10 according to the present invention is adopted, as each optical repeater 104, in the typical system structure shown in FIG. 25. Further, herein the Raman amplifiers 10 according to the present invention are also adopted, as the post-amplifier 101C within the optical sender station 101 and the pre-amplifier 102C within the optical receiver station 102. Only, for the post-amplifier 101C, there shall be adopted a concentrated Raman amplifier internally provided with an amplifying medium, rather than a distributed Raman amplifier utilizing the optical transmission path 103 as an amplifying medium.

Figure 16:
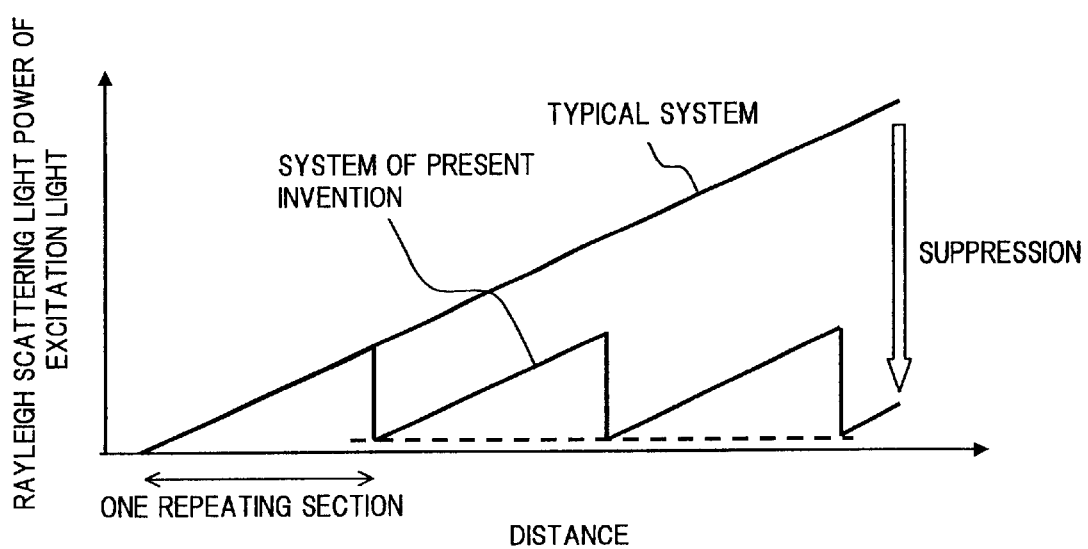
FIG. 16 is a conceptual diagram for explaining an operation in the optical transmission system of the first embodiment.

In the optical transmission system 100A having such a constitution, the Rayleigh scattering lights of the backward excitation lights (or leaked lights from forward excitation lights) are suppressed at the Raman amplifier 10 in each repeating section as shown in a conceptual diagram of FIG. 16. Therefore, it is avoided such a situation as in a typical system where the Rayleigh scattering lights of the excitation lights mixedly existing within the wavelength band of signal lights are repeatedly transmitted while being amplified and then accumulated so that the optical power of the Rayleigh scattering lights is extremely increased as compared with the optical power of the signal lights. Thus, it becomes possible to reduce affections of cross-talk or four-wave mixing, and a change in Raman gain characteristic due to such as Rayleigh scattering lights of the excitation lights, thereby enabling to repeatingly transmit a WDM signal light in a broad band with excellent characteristics.

Figure 17:
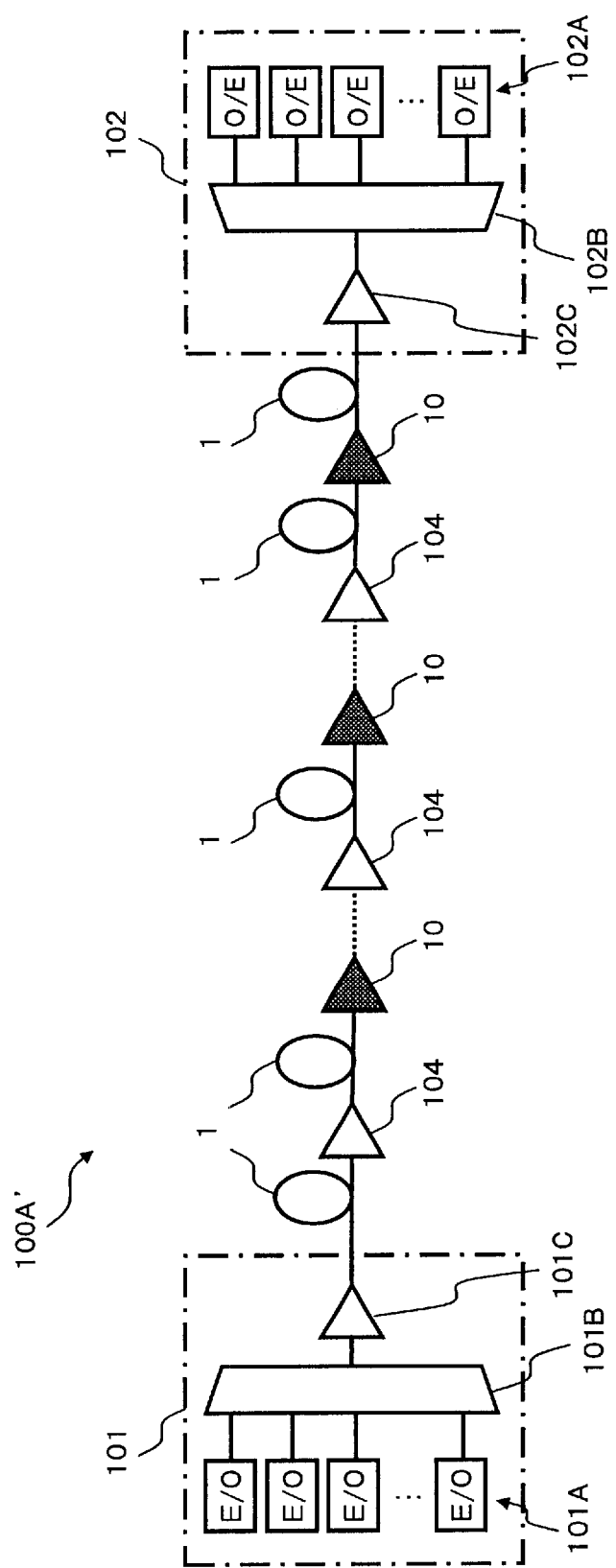
FIG. 17 is a view showing another exemplary constitution related to the optical transmission system of the first embodiment.

In the optical transmission system 100A, the Raman amplifiers 10 according to the present invention have been applied to all of the repeating sections. However, as shown by a system 100A' of FIG. 17, it is possible to suppress such as the Rayleigh scattering lights of the excitation lights, by adopting the Raman amplifiers 10 to a required number of repeating sections. It is also possible to suppress such as the Rayleigh scattering lights of the excitation lights, by applying to an optical repeater the combination of the Raman amplifier 10 of the present invention and a known optical amplifier such as an EDFA.

There will be explained hereinafter a second embodiment of an optical transmission system according to the present invention.

Figure 18:
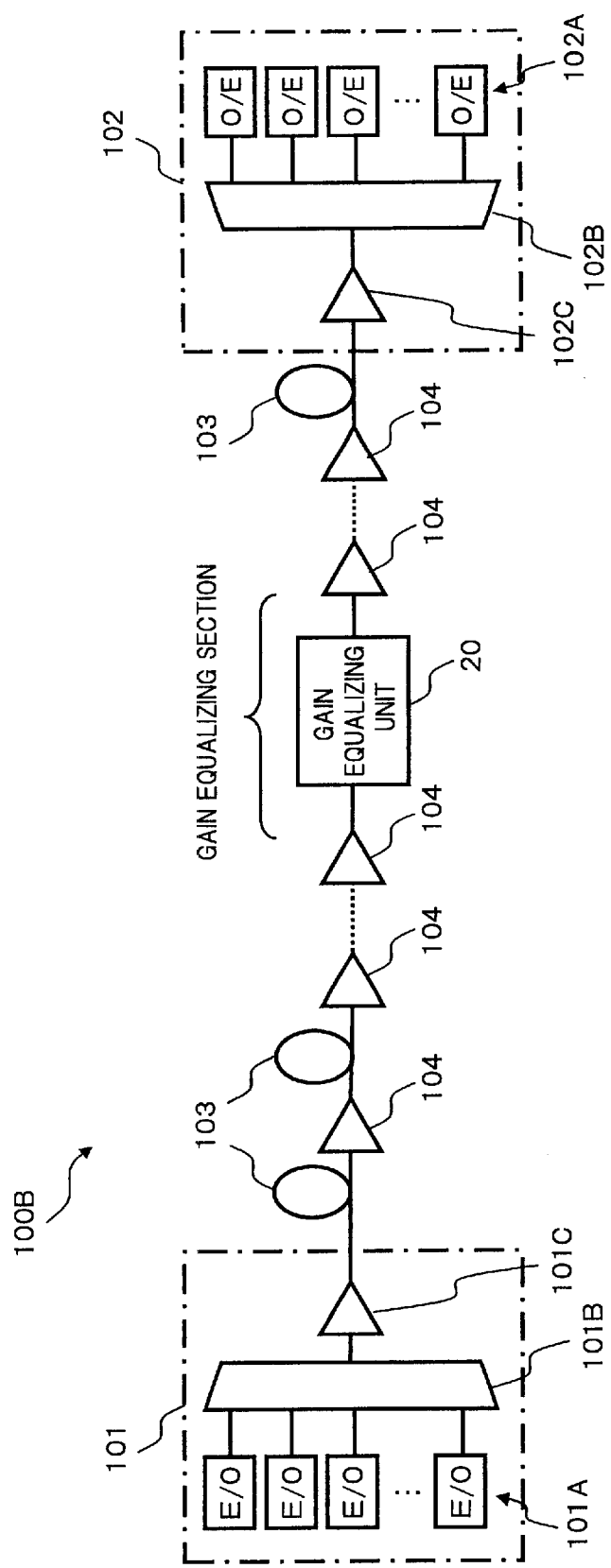
FIG. 18 is a view showing a constitution of a second embodiment of an optical transmission system according to the present invention.

FIG. 18 is a view showing a whole constitution of the optical transmission system in the second embodiment.

In FIG. 18, an optical transmission system 100B is constituted such that, in a case where a repeating section for gain equalizing the WDM signal light to be repeatedly transmitted (hereinafter called "gain equalizing section") is set in a typical system structure, for example, as shown in FIG. 25, a gain equalizing unit 20 is disposed in the gain equalizing section, as a gain compensating device having a function for suppressing the optical components of the same wavelengths as those of the excitation lights.

Figure 19:
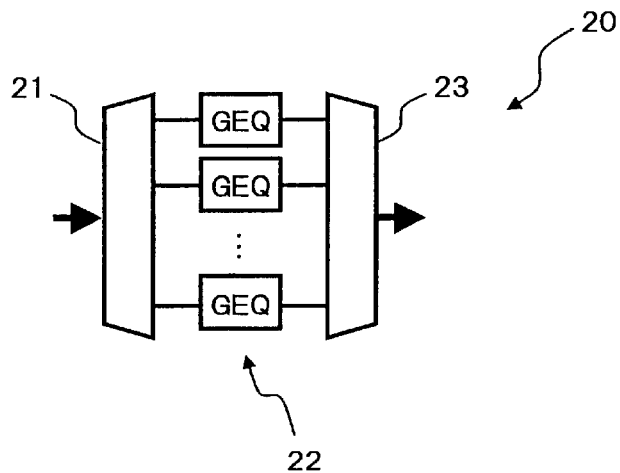
FIG. 19 is a view showing an exemplary constitution of a gain equalizing unit in the optical transmission system of the first embodiment.
Figure 20:
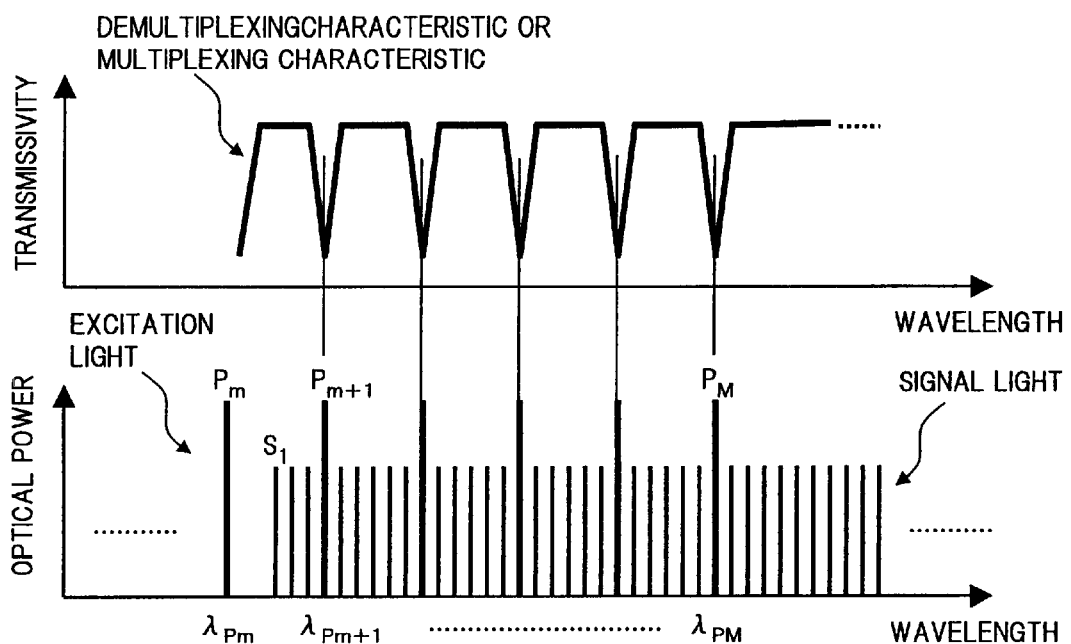
FIG. 20 is a diagram for explaining a characteristic of a demultiplexer in FIG. 19.

For example, as shown in FIG. 19, the gain equalizing unit 20 includes a demultiplexer 21 that demultiplexes the WDM signal light for each of a plurality of wavelength bands, a plurality of gain equalizers (GEQs) 22 that gain equalize signal lights in respective wavelength bands, and a multiplexer 23 that multiplexes the gain equalized signal lights in respective wavelength bands. The demultiplexer 21 demultiplexes the WDM signal light supplied to an input port thereof into the plurality of wavelength bands, in accordance with a demultiplexing characteristic as shown at the upper half of FIG. 20, with the wavelengths $\lambda_{Pm+1}$ to $\lambda_{PM}$ of the excitation lights mixedly existing within the wavelength bands of the WDM signal light as at least the boundary. Then, the demultiplexer 21 outputs the signal lights in the respective wavelength bands to the gain equalizers 22 via corresponding output ports, respectively. Each gain equalizer 22 is a known gain compensating device that brings each of the wavelength lights included in the input signal light to a desired level. The multiplexer 23 has a multiplexing characteristic corresponding to the demultiplexer 21, to multiplex the signal lights in respective wavelength bands output from the gain equalizers 22 into a WDM signal light and then output the WDM signal light to the optical transmission path 1.

In the gain equalizing unit 20 having the aforementioned constitution, when the demultiplexer 21 is input with the WDM signal light that has been propagated through the repeating sections up to the former stage to be Raman amplified, and the Rayleigh scattering lights of the excitation lights and the like, the Rayleigh scattering lights of the excitation lights, having the central wavelengths coincident with the boundaries of the respective wavelength bands, are attenuated to be suppressed by the aforementioned demultiplexing characteristic. Additionally, when the signal lights are multiplexed by the multiplexer 23 after gain equalized by the gain equalizers 22, respectively, the Rayleigh scattering lights of the excitation lights are also suppressed in the same manner as when passed through the demultiplexer 21. Thus, since the Rayleigh scattering lights of the excitation lights included in the output light from the gain equalizing unit 20 are remarkably reduced, it becomes possible to reduce affections of cross-talk or four-wave mixing, and a change in Raman gain characteristic and the like, thereby enabling to repeatingly transmit a WDM signal light in a broad band with excellent characteristics.

Next, there will be explained a third embodiment of an optical transmission system according to the present invention.

Figure 21:
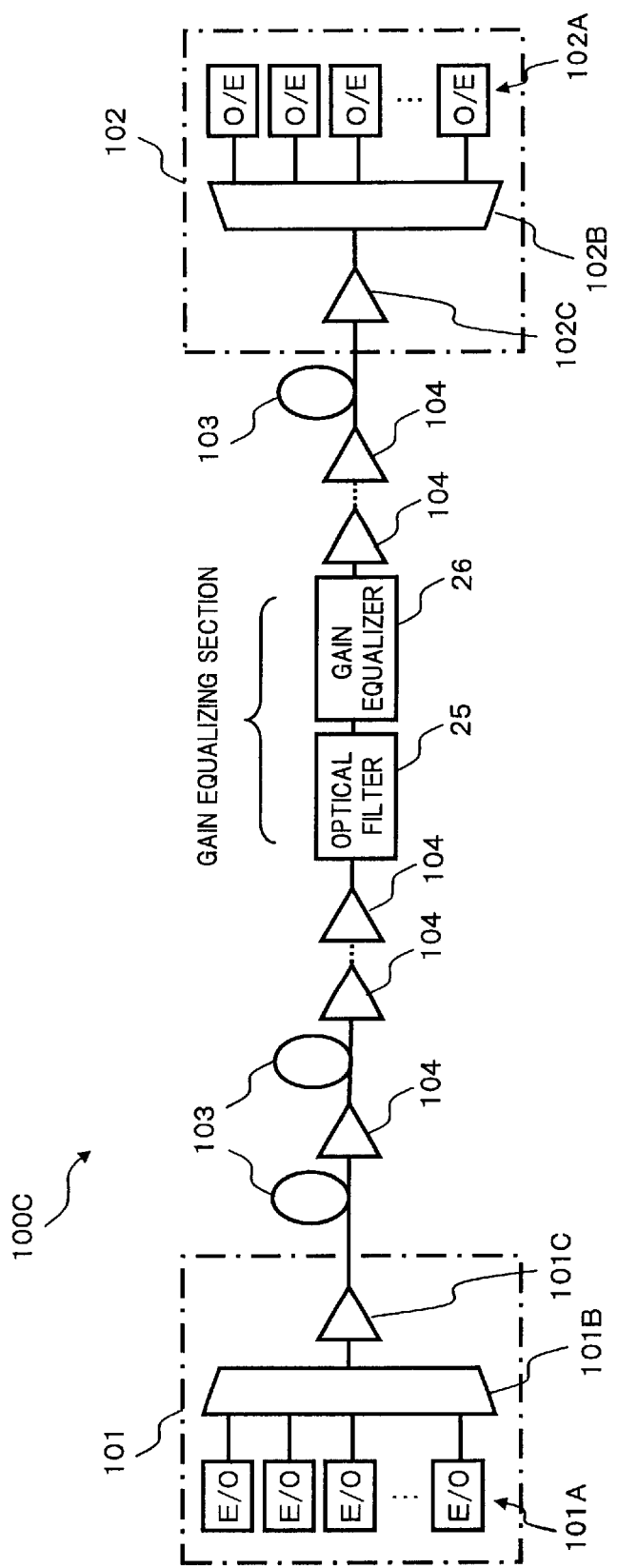
FIG. 21 is a view showing a constitution of a third embodiment of an optical transmission system according to the present invention.

FIG. 21 is a view showing a whole constitution of the optical transmission system in the third embodiment.

In FIG. 21, an optical transmission system 100C is constituted such that, for the optical transmission system 100B of the second embodiment, an optical filter 25 as an excitation light suppressing unit, and a gain equalizer 26 are disposed, instead of the gain equalizing unit 20. The constitution other than the above is the same as the constitution of the second embodiment.

The optical filter 25 is the same as the optical filter 13 in the basic constitution of the Raman amplifier according to the present invention shown in FIG. 1, and has a filtering characteristic for suppressing the optical components of the same wavelengths as those of the excitation lights. The gain equalizer 26 is a known gain compensating device that brings each of the respective wavelength lights included in the WDM signal light passed through the optical filter 25 to a desired level.

In such an optical transmission system 100C, the optical filter 25 of the gain equalizing section is input with the WDM signal light that has been propagated through the repeating sections up to the former stage of the gain equalizing section to be Raman amplified, and the Rayleigh scattering lights of the excitation lights and the like, to suppress the Rayleigh scattering lights of the excitation lights. Thus, the WDM signal light that does not substantially include the Rayleigh scattering lights accumulated until the former stage repeating section is sent to the gain equalizer 26, to be gain equalized. Thus, also in this optical transmission system 100C, it becomes possible to obtain the same effect as in the optical transmission system 100B of the second embodiment.

Figure 22:
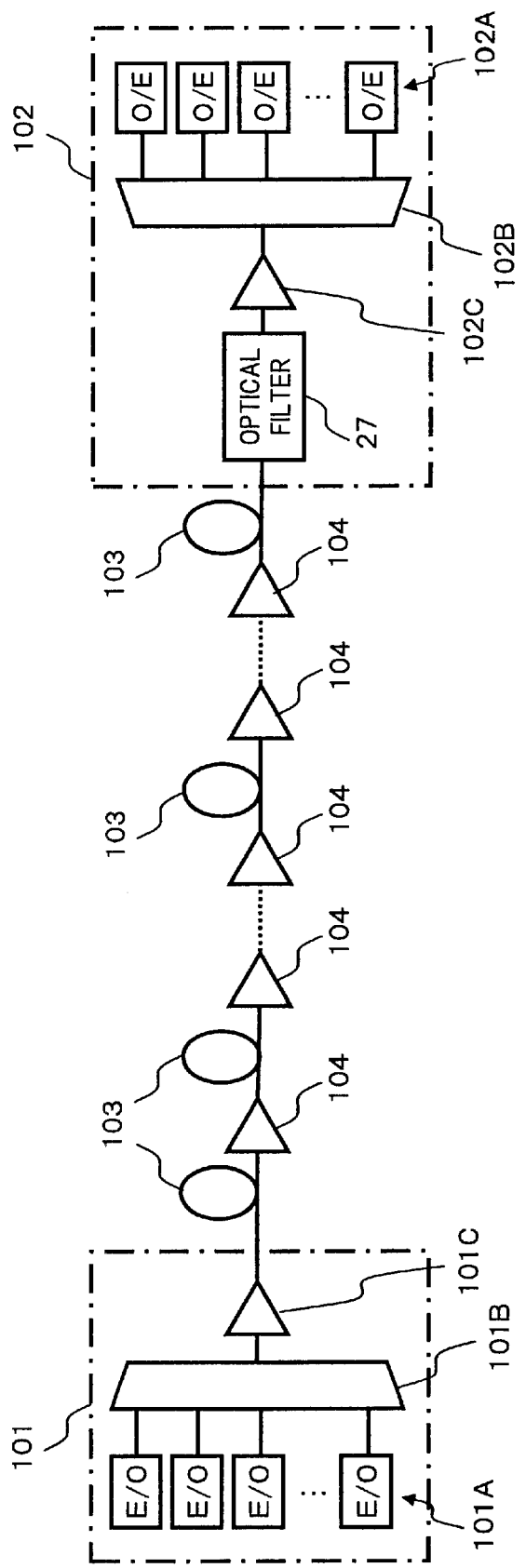
FIG. 22 is a view showing another exemplary constitution related to the optical transmission system of the third embodiment.

In the optical transmission system 100C, there has been provided the optical filter 25 as the excitation light suppressing unit, for the gain equalizing section. However, for example as in FIG. 22, it is possible to provide an optical filter 27 as an excitation light suppressing unit at the former stage of the pre-amplifier 102C of the optical receiver station 102, so that such as the accumulated Rayleigh scattering lights of the excitation lights are suppressed in the optical receiver station 102.

Next, there will be explained a fourth embodiment of an optical transmission system according to the present invention.

Figure 23:
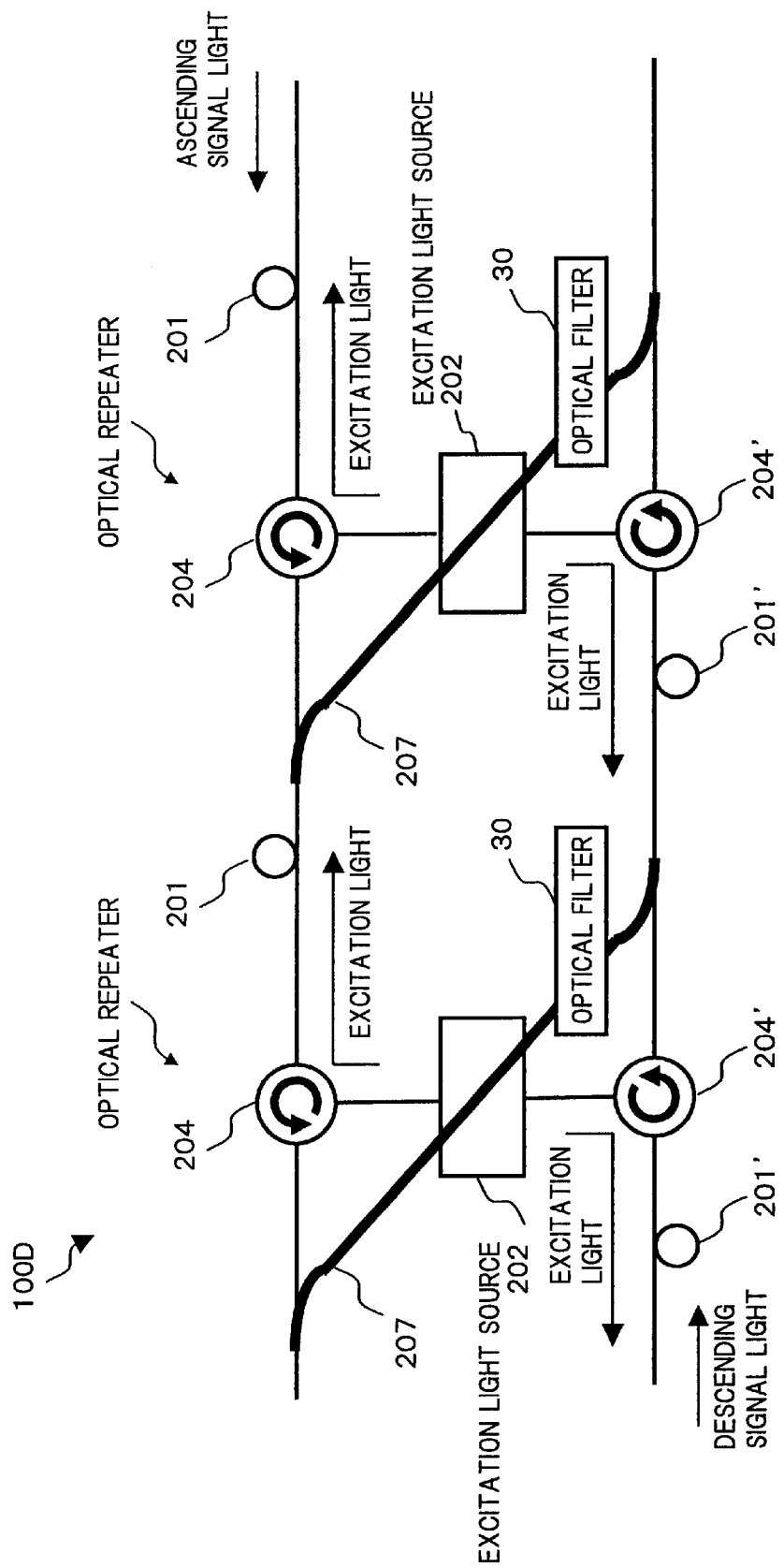
FIG. 23 is a view showing a constitution of a fourth embodiment of an optical transmission system according to the present invention.

FIG. 23 is a view showing a whole constitution of the optical transmission system in the fourth embodiment.

An optical transmission system 100D in FIG. 23 is constituted such that the present invention is applied to a system structure in which an optical time domain reflectometer (OTDR) is utilized to thereby enabling to measure the states of the optical transmission paths as shown in FIG. 32, so as to solve such a disadvantage that the excitation lights pass through an optical path for OTDR to thereby be propagated through the opposite optical transmission path. Specifically, in the optical transmission system 100D, with paired ascending line and descending line having the signal light propagation directions opposite to each other as one system unit, there is commonly used an optical repeater in each repeating section by the ascending and descending lines, such that the excitation lights for Raman amplification generated in the excitation light source 202 in each optical repeater are supplied, as backward excitation lights, to an ascending optical transmission path 201 and a descending optical transmission path 201' through an ascending side optical circulator 204 and a descending side optical circulator 204', respectively. Further, the optical transmission system 100D includes an optical path 207 for OTDR measurement that connects between the optical transmission paths 201 and 201', corresponding to each optical repeater. Each optical path 207 for OTDR measurement has opposite ends connected to the vicinities of the ports "b" (signal light outputting ports) of the optical circulators 204 and 204' on the optical transmission paths 201 and 201', respectively, and this optical path 207 is capable of sending a reflected light of an optical pulse for OTDR measurement that has been transmitted in the same direction as the signal light to the optical transmission path at one line side, to the optical transmission path at the other line side. An optical filter 30 as an excitation light wavelength suppressing unit is inserted onto the optical path 207 for OTDR measurement. This optical filter 30 is the same as the optical filter 13 in the basic constitution of the Raman amplifier according to the present invention shown in FIG. 1, and has a filtering characteristic for suppressing the optical components of the same wavelengths as those of the excitation lights.

In the optical transmission system 100D having the aforementioned constitution, the leaked lights from the backward excitation lights supplied to the optical transmission paths 201 and 201' on the ascending line and the descending line, respectively, are input to the optical path 207 for OTDR measurement. However, the leaked lights being propagated through the optical path 207 are suppressed by the optical filter 30. Thus, during in-service, it is avoided that the leaked lights from the backward excitation lights being propagated through one side optical transmission path pass through the optical path 207 for OTDR measurement and are supplied to the other side optical transmission path to act as forward excitation lights. Thus, it is possible to stably perform the Raman amplification of the signal light in each line. Further, in performing the OTDR measurement, only the reflected light of the measuring optical pulse (being set at a wavelength different from excitation lights) passes through the optical path 207 to be transmitted to the opposite optical transmission path. Thus, there is decreased such a possibility that the leaked lights from the backward excitation lights act as noises to affect the OTDR measurement. Therefore, it is possible to perform the OTDR measurement with high accuracy. Such an effect can be obtained in both cases where the wavelength band of excitation lights is different from the wavelength band of signal lights and where the former is overlapped with the latter.

Figure 24:
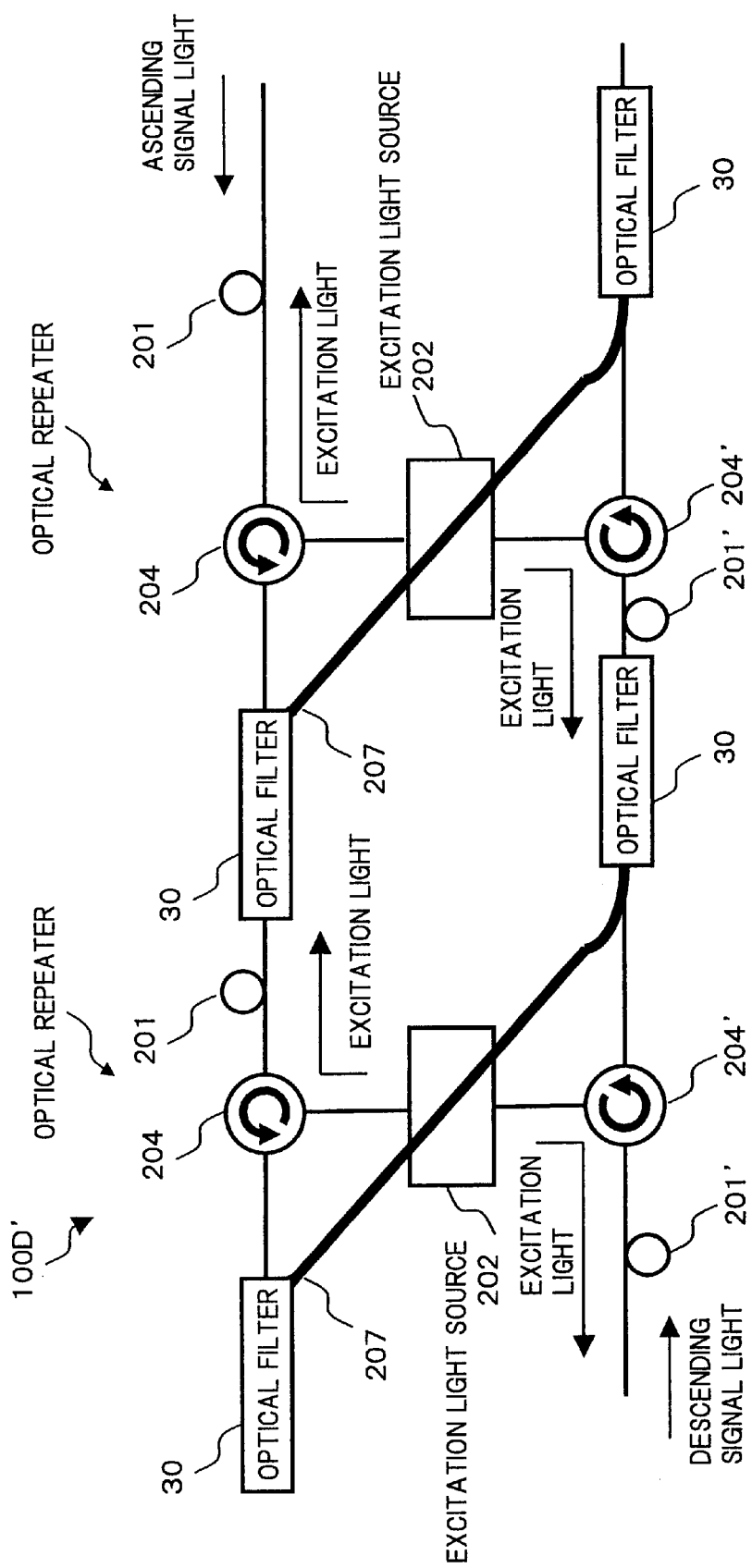
FIG. 24 is a block diagram showing another exemplary constitution related to the optical transmission system of the fourth embodiment.

In the optical transmission system 100D, there has been described the exemplary constitution where the optical filter 30 acting as the excitation light wavelength suppressing unit is inserted onto the optical path 207 for OTDR measurement. However, it is also possible to arrange each optical filter 30 near a connecting portion of the optical path 207 with the optical transmission path as shown by an optical transmission system 100D' in FIG. 24, to suppress the leaked lights from the excitation lights before the leaked lights are input to the optical path 207 for OTDR measurement. Further, there has been described the exemplary constitution of the backward excitation type in this embodiment. However, the aforementioned constitution is also effective in cases of a forward excitation type and a bidirectional excitation type. In these cases, the Rayleigh scattering lights of the forward excitation lights are suppressed by the optical filter 30 on the optical path 207 for OTDR measurement.

What is claimed is:

1. A Raman amplifier supplying excitation lights to an amplifying medium on an optical transmission path through which signal lights are propagated, to Raman amplify the signal lights being propagated through said amplifying medium, wherein, when a wavelength band of the excitation lights has a region overlapped with a wavelength band of the signal lights, said Raman amplifier comprises an excitation light wavelength suppressing unit capable of suppressing optical components which are included in lights propagated through said amplifying medium and are of the same wavelengths as those of the excitation lights within the region overlapped with the wavelength band of the signal lights, wherein, when said optical transmission path is a hybrid transmission path including a first fiber having a positive wavelength dispersion and a positive dispersion slope relative to a wavelength band of the signal lights and a second fiber having a negative wavelength dispersion and a negative dispersion slope relative to the wavelength band of the signal lights, and the signal lights are supplied so as to be propagated through said first fiber and said second fiber sequentially, said excitation light wavelength suppressing unit is arranged on said first fiber.

2. A Raman amplifier according to claim 1, further comprising:

an excitation light generating unit that generates excitation lights; and a multiplexing unit that supplies, to said amplifying medium, the excitation lights from the excitation light generating unit as backward excitation lights to be propagated in a direction opposite to a propagation direction of the signal lights, wherein said excitation light wavelength suppressing unit suppresses Rayleigh scattering lights of the backward excitation lights included in the lights propagated through said amplifying medium.

3. A Raman amplifier according to claim 2, wherein said multiplexing unit includes:

a first port connected to a signal light output end of said amplifying medium;

a second port connected to an input end of said excitation light wavelength suppressing unit; and a third port connected to an output end of said excitation light generating unit, and having a directionality capable of transmitting the light directed from said first port toward said second port and the light from said third port toward said first port.

4. A Raman amplifier according to claim 3, wherein said multiplexing unit is an optical circulator.

5. A Raman amplifier according to claim 2, wherein, when said Raman amplifier further comprises a demultiplexing unit that demultiplexes a part of the light propagated through said amplifying medium, and an output monitoring unit that monitors the Raman amplified signal light, based on the light demultiplexed in said demultiplexing unit, said excitation light wavelength suppressing unit is arranged on an optical path between said multiplexing unit and said output monitoring unit.

6. A Raman amplifier according to claim 1, further comprising:

an excitation light generating unit that generates excitation lights; and a multiplexing unit that supplies, to said amplifying medium, the excitation lights from the excitation light generating unit as forward excitation lights to be propagated in a direction which is the same as a propagation direction of the signal lights, wherein said excitation light wavelength suppressing unit suppresses leaked lights from the forward excitation lights included in the lights propagated through said amplifying medium.

7. A Raman amplifier according to claim 6, wherein, when said Raman amplifier further comprises a demultiplexing unit that demultiplexes a part of the light propagated through said amplifying medium, and an output monitoring unit that monitors the Raman amplified signal light, based on the light demultiplexed in said demultiplexing unit, said excitation light wavelength suppressing unit is arranged on an optical path between a signal light output end of said amplifying medium and said output monitoring unit.

8. A Raman amplifier according to claim 1, wherein said excitation light wavelength suppressing unit also suppresses optical components of the same wavelengths as those of the excitation lights outside the wavelength band of the signal lights.

9. A Raman amplifier according to claim 1 wherein said excitation light wavelength suppressing unit is an optical filter of which transmissivity is steeply changed corresponding to wavelengths of the excitation lights.

10. An optical transmission system for supplying excitation lights from a Raman amplifier to an amplifying medium on an optical transmission path through which signal lights are propagated, to transmit the signal lights while Raman amplifying the signal lights, wherein, when a wavelength band of the excitation lights has a region overlapped with a wavelength band of the signal lights, the optical transmission system comprises an excitation light wavelength suppressing unit capable of suppressing optical components which are included in lights propagated through said amplifying medium and are of the same wavelengths as those of the excitation lights within the region overlapped with the wavelength band of the signal lights, further comprising a gain compensating device that compensates for a gain wavelength characteristic of the signal lights being propagated through the optical transmission path, wherein said excitation light wavelength suppressing unit is provided in said gain compensating device.

11. An optical transmission system according to claim 10, wherein said excitation light wavelength suppressing unit is provided in said Raman amplifier.

12. An optical transmission system according to claim 10, wherein said gain compensating device includes:

a demultiplexing unit that demultiplexes signal lights into a plurality of wavelength bands, with the wavelengths of the excitation lights within the region overlapped with the wavelength band of the signal lights at at least the boundary;

a plurality of gain compensating units that gain compensate for each of the signal lights of respective wavelengths demultiplexed in said demultiplexing unit; and a multiplexing unit that multiplexes the signal lights of respective wavelengths gain compensated in said respective gain compensating units, and said demultiplexing unit and said multiplexing unit function as said excitation light wavelengths suppressing unit.

13. An optical transmission system according to claim 10, further comprising an optical receiver device that receives and processes the signal lights propagated through the optical transmission path, wherein said excitation light wavelength suppressing unit is provided in said optical receiver device.

14. An optical transmission system according to claim 10, further comprising:

a pair of optical transmission paths through which the signal lights are propagated in directions different from each other; and an optical path for OTDR connecting between said optical transmission paths so as to enable to measure the states of the optical transmission paths by utilizing an optical time domain reflectometer (OTDR), wherein said excitation light wavelength suppressing unit is arranged on said optical path for OTDR.

15. An optical transmission system according to claim 10, further comprising:

a pair of optical transmission paths through which the signal lights are propagated in directions different from each other; and an optical path for OTDR connecting between said optical transmission paths so as to enable to measure the states of the optical transmission paths by utilizing an optical time domain reflectometer (OTDR), wherein said excitation light wavelength suppressing units are arranged on the vicinities of the connecting portions of said optical path for OTDR with said optical paths.

16. An optical transmission system according to claim 10, wherein said excitation light wavelength suppressing unit also suppresses optical components of the same wavelengths as those of the excitation lights outside the wavelength band of the signal lights.

17. An optical transmission system according to claim 10, wherein said excitation light wavelength suppressing unit is an optical filter of which transmissivity is steeply changed corresponding to wavelengths of the excitation lights.

18. A Raman amplifier for supplying excitation lights to an amplifying medium on an optical transmission path through which signal lights are propagated, to Raman amplify the signal lights being propagated through said amplifying medium, wherein, when a wavelength band of the excitation lights has a region overlapped with a wavelength band of the signal lights, said Raman amplifier comprises an excitation light wavelength suppressing unit capable of suppressing optical components which are included in lights propagated through said amplifying medium and are of the same wavelengths as those of the excitation lights within the region overlapped with the wavelength band of said signal lights, said Raman amplifier further comprising:
- an excitation light generating unit that generates excitation lights; and
- a multiplexing unit that supplies, to said amplifying medium, the excitation lights from the excitation light generating unit as backward excitation lights to be propagated in a direction opposite to a propagation direction of the signal lights,
- wherein said excitation light wavelength suppressing unit suppresses Rayleigh scattering lights of the backward excitation lights included in the lights propagated through said amplifying medium;
- wherein, when said Raman amplifier further comprises a demultiplexing unit that demultiplexes a part of the light propagated through said amplifying medium, and an output monitoring unit that monitors the Raman amplified signal light, based on the light demultiplexed in said demultiplexing unit, said excitation light wavelength suppressing unit is arranged on an optical path between said multiplexing unit and said output monitoring unit.

19. A Raman amplifier supplying excitation lights to an amplifying medium on an optical transmission path through which signal lights are propagated, to Raman amplify the signal lights being propagated through said amplifying medium, wherein, when a wavelength band of the excitation lights has a region overlapped with a wavelength band of the signal lights, said Raman amplifier comprises an excitation light wavelength suppressing unit capable of suppressing optical components which are included in lights propagated through said amplifying medium and are of the same wavelengths as those of the excitation lights within the region overlapped with the wavelength band of said signal lights, said Raman amplifier further comprising:
- an excitation light generating unit that generates excitation lights; and
- a multiplexing unit that supplies, to said amplifying medium, the excitation lights from the excitation light generating unit as forward excitation lights to be propagated in a direction which is the same as a propagation direction of the signal lights,
- wherein said excitation light wavelength suppressing unit suppresses leaked lights from the forward excitation lights included in the lights propagated through said amplifying medium,
- wherein, when said Raman amplifier further comprises a demultiplexing unit that demultiplexes a part of the light propagated through said amplifying medium, and an output monitoring unit that monitors the Raman amplified signal light, based on the light demultiplexed in said demultiplexing unit,
- said excitation light wavelength suppressing unit is arranged on an optical path between a signal light output end of said amplifying medium and said output monitoring unit.

20. An optical transmission system supplying excitation lights from a Raman amplifier to an amplifying medium on an optical transmission path through which signal lights are propagated, to transmit the signal lights while Raman amplifying the signal lights,
- wherein, when a wavelength band of the excitation lights has a region overlapped with a wavelength band of the signal lights, the optical transmission system comprises an excitation light wavelength suppressing unit capable of suppressing optical components which are included in lights propagated through said amplifying medium and are of the same wavelengths as those of the excitation lights within the region overlapped with the wavelength band of the signal lights,
- said Raman amplifier further comprising an optical receiver device that receives and processes the signal lights propagated through the optical transmission path, wherein said excitation light wavelength suppressing unit is provided in said optical receiver device.

21. An optical transmission system supplying excitation lights from a Raman amplifier to an amplifying medium on an optical transmission path through which signal lights are propagated, to transmit the signal lights while Raman amplifying the signal lights,
- wherein, when a wavelength band of the excitation lights has a region overlapped with a wavelength band of the signal lights, the optical transmission system comprises an excitation light wavelength suppressing unit capable of suppressing optical components which are included in lights propagated through said amplifying medium and are of the same wavelengths as those of the excitation lights within the region overlapped with the wavelength band of the signal lights, said Raman amplifier further comprising:
  - a pair of optical transmission paths through which signal lights are propagated in directions different from each other; and
  - an optical path for OTDR connecting between said optical transmission paths so as to enable to measure the states of the optical transmission paths by utilizing an optical time domain reflectometer (OTDR),
  - wherein said excitation light wavelength suppressing unit is arranged on said optical path for OTDR.

22. An optical transmission system supplying excitation lights from a Raman amplifier to an amplifying medium on an optical transmission path through which signal lights are propagated, to transmit the signal lights while Raman amplifying the signal lights,
- wherein, when a wavelength band of the excitation lights has a region overlapped with a wavelength band of the signal lights, the optical transmission system comprises an excitation light wavelength suppressing unit capable of suppressing optical components which are included in lights propagated through said amplifying medium and are of the same wavelengths as those of the excitation lights within the region overlapped with the wavelength band of the signal lights, said Raman amplifier further comprising:
  - a pair of optical transmission paths through which the signal lights are propagated in directions different from each other; and
  - an optical path for OTDR connecting between said optical transmission paths so as to enable to measure the states of the optical transmission paths by utilizing an optical time domain reflectometer (OTDR),
  - wherein said excitation light wavelength suppressing units are arranged on the vicinities of the connecting portions of said optical path for OTDR with said optical paths.

* * * * *